US009535945B2

(12) United States Patent
Andress et al.

(10) Patent No.: US 9,535,945 B2
(45) Date of Patent: Jan. 3, 2017

(54) INTENT BASED SEARCH RESULTS ASSOCIATED WITH A MODULAR SEARCH OBJECT FRAMEWORK

(71) Applicant: Yahoo! Inc., Sunnyvale, CA (US)

(72) Inventors: Scott Richard Andress, San Jose, CA (US); Andrew Poon, San Francisco, CA (US); Carrie Christina Merry Barkema, Sunnyvale, CA (US); Rafael Vasconcellos Coelho, San Francisco, CA (US); Alicia Korn, San Francisco, CA (US); Vanessa Ilona Grass, San Francisco, CA (US); Guilherme de Barros Chapiewski, Cupertino, CA (US); Ivan Young Lee, Sunnyvale, CA (US); Michael Eric Plasmeier, Mountain View, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 68 days.

(21) Appl. No.: 14/266,565

(22) Filed: Apr. 30, 2014

(65) Prior Publication Data
US 2015/0317354 A1 Nov. 5, 2015

(51) Int. Cl.
*G06F 17/30* (2006.01)

(52) U.S. Cl.
CPC ..... *G06F 17/30398* (2013.01); *G06F 17/3064* (2013.01); *G06F 17/30554* (2013.01); *G06F 17/30864* (2013.01)

(58) Field of Classification Search
USPC .................................................. 707/706, 722
See application file for complete search history.

(56) References Cited

U.S. PATENT DOCUMENTS

| 5,469,536 A | 11/1995 | Blank |
| 6,972,363 B2 | 12/2005 | Georges et al. |
| 7,487,144 B2 * | 2/2009 | Shakib .............. G06F 17/30864 |
| D622,283 S | 8/2010 | Van Os |
| D624,927 S | 10/2010 | Allen et al. |
| 8,140,512 B2 * | 3/2012 | Jensen ................ G06F 17/3053 |
| | | 707/703 |
| D666,626 S | 9/2012 | Mori et al. |
| D670,308 S | 11/2012 | Vance et al. |

(Continued)

FOREIGN PATENT DOCUMENTS

WO WO 2004/099916 A2 11/2004

OTHER PUBLICATIONS http://facebook.github.io/react/docs/tutorial.html, author unknown, 12 pgs., retrieved May 19, 2014.

(Continued)

*Primary Examiner* — Kim Nguyen
(74) *Attorney, Agent, or Firm* — Brinks Gilson & Lione

(57) ABSTRACT

A modular search object framework provides modular search results including entity search results reflecting the intent of a searcher. Also, an interface (such as a graphical user interface provided by the framework), aids in organizing results (such as links, titles, and description) according to the intent of the user as manifest in the search query and interactions with the interface. Circuitry of the framework also predicts user intent from historical information corresponding to the searcher (or to a group with which the searcher is associated).

18 Claims, 16 Drawing Sheets

(56) References Cited

U.S. PATENT DOCUMENTS

| | | | |
|---|---|---|---|
| D670,725 S | 11/2012 | Mori et al. | |
| D678,304 S | 3/2013 | Yakoub et al. | |
| D687,848 S | 8/2013 | Jou | |
| 8,510,287 B1* | 8/2013 | Wu | G06F 7/00 707/706 |
| 8,527,487 B2* | 9/2013 | Hu | G06F 17/30899 707/706 |
| D694,254 S | 11/2013 | Brinda et al. | |
| 8,600,980 B2* | 12/2013 | Jensen | G06F 17/3053 707/706 |
| D701,521 S | 3/2014 | Kim et al. | |
| 8,666,974 B2* | 3/2014 | Oliver | G06F 17/3053 707/705 |
| D702,727 S | 4/2014 | Abratowski et al. | |
| D702,728 S | 4/2014 | Abratowski et al. | |
| 8,688,726 B2* | 4/2014 | Mahajan | G06F 17/3087 455/456.1 |
| D704,673 S | 5/2014 | Agarwal | |
| D707,249 S | 6/2014 | Yamada | |
| D710,378 S | 8/2014 | Lemay et al. | |
| D710,874 S | 8/2014 | Kim et al. | |
| D711,397 S | 8/2014 | Lawson et al. | |
| D711,418 S | 8/2014 | Xie et al. | |
| D711,427 S | 8/2014 | Clarke et al. | |
| D711,915 S | 8/2014 | Wong et al. | |
| 8,812,981 B1 | 8/2014 | Iten et al. | |
| D715,248 S | 10/2014 | Agarwal | |
| D716,833 S | 11/2014 | Donahue et al. | |
| 8,881,048 B2 | 11/2014 | Bakhash | |
| D718,779 S | 12/2014 | Hang Sik et al. | |
| D718,781 S | 12/2014 | Arnold et al. | |
| D720,364 S | 12/2014 | Park et al. | |
| D720,766 S | 1/2015 | Mandal et al. | |
| D721,382 S | 1/2015 | Brinda et al. | |
| D724,603 S | 3/2015 | Williams et al. | |
| D726,736 S | 4/2015 | Smirin et al. | |
| D726,759 S | 4/2015 | Brinda et al. | |
| D730,382 S | 5/2015 | Brinda et al. | |
| D730,384 S | 5/2015 | Nagasawa et al. | |
| D731,514 S | 6/2015 | Lee | |
| D732,558 S | 6/2015 | Bentley | |
| D732,565 S | 6/2015 | Omiya | |
| 9,075,568 B1 | 7/2015 | Gray | |
| D735,737 S | 8/2015 | Lee | |
| D735,741 S | 8/2015 | Kim | |
| D736,788 S | 8/2015 | Rosenberg et al. | |
| D737,298 S | 8/2015 | Jung | |
| D737,314 S | 8/2015 | Shiplacoff et al. | |
| D738,902 S | 9/2015 | Roberts et al. | |
| D738,910 S | 9/2015 | Drozd et al. | |
| 9,158,441 B2 | 10/2015 | Hilton et al. | |
| 9,176,938 B1 | 11/2015 | Kerschen et al. | |
| 9,189,876 B2 | 11/2015 | Ubillos et al. | |
| D752,605 S | 3/2016 | Wang | |
| D752,615 S | 3/2016 | Huang et al. | |
| D760,738 S | 7/2016 | Scalisi et al. | |
| D761,294 S | 7/2016 | Weeresinghe | |
| 2003/0142140 A1 | 7/2003 | Brown et al. | |
| 2008/0104024 A1 | 5/2008 | Kumar et al. | |
| 2009/0002335 A1 | 1/2009 | Chaudhri | |
| 2009/0076899 A1 | 3/2009 | Gbodimowo | |
| 2010/0125604 A1 | 5/2010 | Martinez et al. | |
| 2010/0174993 A1 | 7/2010 | Pennington et al. | |
| 2011/0035406 A1 | 2/2011 | Petrou et al. | |
| 2011/0314419 A1 | 12/2011 | Dunn et al. | |
| 2012/0084297 A1 | 4/2012 | Mishne et al. | |
| 2012/0174011 A1 | 7/2012 | Cabrera-Cordon et al. | |
| 2012/0246165 A1 | 9/2012 | Batraski et al. | |
| 2012/0254804 A1 | 10/2012 | Sheha et al. | |
| 2013/0072308 A1 | 3/2013 | Peck et al. | |
| 2013/0125060 A1 | 5/2013 | Lee et al. | |
| 2013/0125061 A1 | 5/2013 | Lee et al. | |
| 2013/0125063 A1 | 5/2013 | Lee et al. | |
| 2013/0230842 A1* | 9/2013 | Elgart | G09B 19/00 434/322 |
| 2013/0231980 A1* | 9/2013 | Elgart | G06Q 10/0639 705/7.38 |
| 2013/0235067 A1 | 9/2013 | Cherna et al. | |
| 2013/0239003 A1 | 9/2013 | Usenko et al. | |
| 2014/0258014 A1 | 9/2014 | Collins et al. | |
| 2015/0269176 A1* | 9/2015 | Marantz | G06F 17/3097 707/767 |
| 2015/0286863 A1 | 10/2015 | Dhua et al. | |
| 2015/0317319 A1 | 11/2015 | Andress et al. | |
| 2015/0317354 A1 | 11/2015 | Andress et al. | |
| 2015/0317365 A1 | 11/2015 | Andress et al. | |
| 2015/0317945 A1 | 11/2015 | Andress et al. | |

OTHER PUBLICATIONS http://facebook.github.io/react/docs/thinking-in-react.html, author unknown, 5 pgs., retrieved May 19, 2014.
http://facebook.github.io/react/docs/interactivity-and-dynamic-uis.html, author unknown, 3 pgs., retrieved May 19, 2014.
http://facebook.github.io/react/docs/multiple-components.html, author unknown, 4 pgs., retrieved May 19, 2014.
http://facebook.github.io/react/docs/reusable-components.html, author unknown, 4 pgs., retrieved May 19, 2014.
http://facebook.github.io/react/docs/forms.html, author unknown, 3 pgs., retrieved May 19, 2014.
http://facebook.github.io/react/docs/working-with-the-browser.html, author unknown, 3 pgs., retrieved May 19, 2014.
http://facebook.github.io/react/docs/addons.html, author unknown, 2 pgs., retrieved May 19, 2014.
http://en.wikipedia.org/wiki/Facebook_Paper, author unknown, 6pgs., retrieved May 19, 2014.
Best Inspirational Mobile and UI App Designs, posted at 56Pixels.com by 56Pixels, posted Mar. 25, 2013, © 2014, [site visited Dec. 3, 2015]. Available from internet: <http://56pixels.com/best-inspirational-mobile-and-ui-app-designs/>.
20 Beautifully Designed Smartphone Apps, posted at WebDesignerDepot.com by Kendra Gaines, posted Jul. 23, 2013, © 2010-2015, [site visited Dec. 3, 2015]. Available from internet:<http://www.webdesignerdepot.com/2013/07/20-beautifully-designed-smartphone-apps/>.
HackUMass 2015, posted at blogs.umass.edu/Techbytes/ by Arbass, posted Oct. 26, 2015, [site visited Dec. 3, 2015]. Available from internet:<http://blogs.umass.edu/Techbytes/>.
Latest Free Mobile UI PSD Kits, posted at TheNeoDesign.com by Yogesh Mankani, posted Apr. 23, 2014, [site visited Dec. 3, 2015]. Available from internet:<http://theneodesign.com/latest-free-mobile-ui-psd-kits/>.
So Fresh n' So Clean: The Magic of Paint, posted at buypalestine.com by Lisa E. Priest, posted Jul. 16, 2014, © 2014 Lisa Priest, Realtor with Picket Fence Realty, Inc., [site visited Dec. 3, 2015]. Available from internet:<http://buypalestine.com/2014/07/16/so-fresh-n-so-clean-the-magic-of-paint/>.
Sony Xperia Z4 Tablet Review: One of the Best Android Tablets you can buy, posted at pcadvisor.co.uk by Chris Martin, posted Jul. 28, 2015, [site visited Dec. 3, 2015]. Available from internet:<http://www.pcadvisor.co.uk/review/android-tablets/sony-xperia-z4-tablet-review-uk-3599843/>.
European Search Report dated Sep. 2, 2015 for EP Application No. 15166037.0 (9 pp.).
Biersdorfer, J.D. et al., "Google: The Missing Manual," 2nd Edition, O'Reilly publishing, Mar. 1, 2006, pp. 1-73 (73 pp.).

* cited by examiner

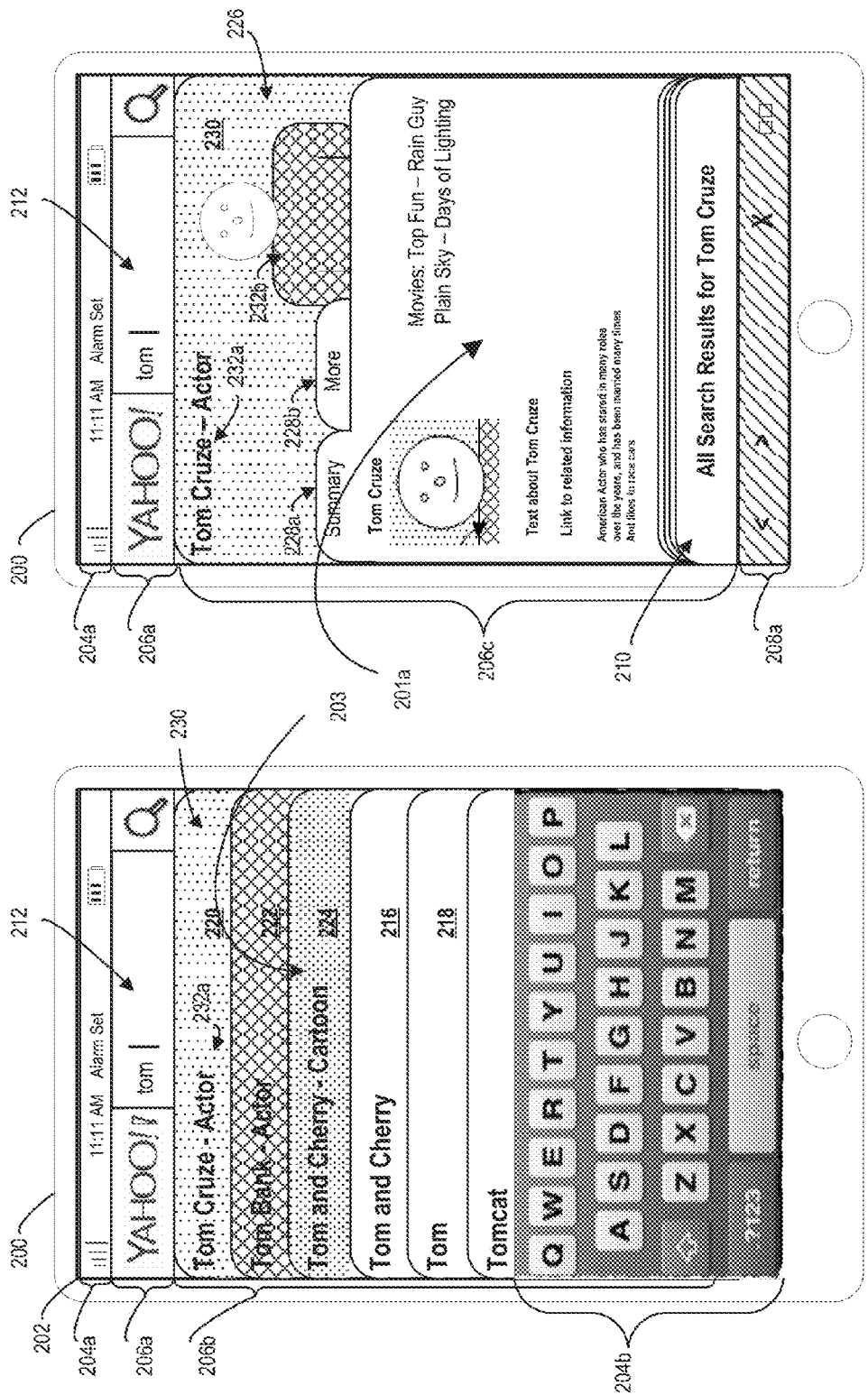

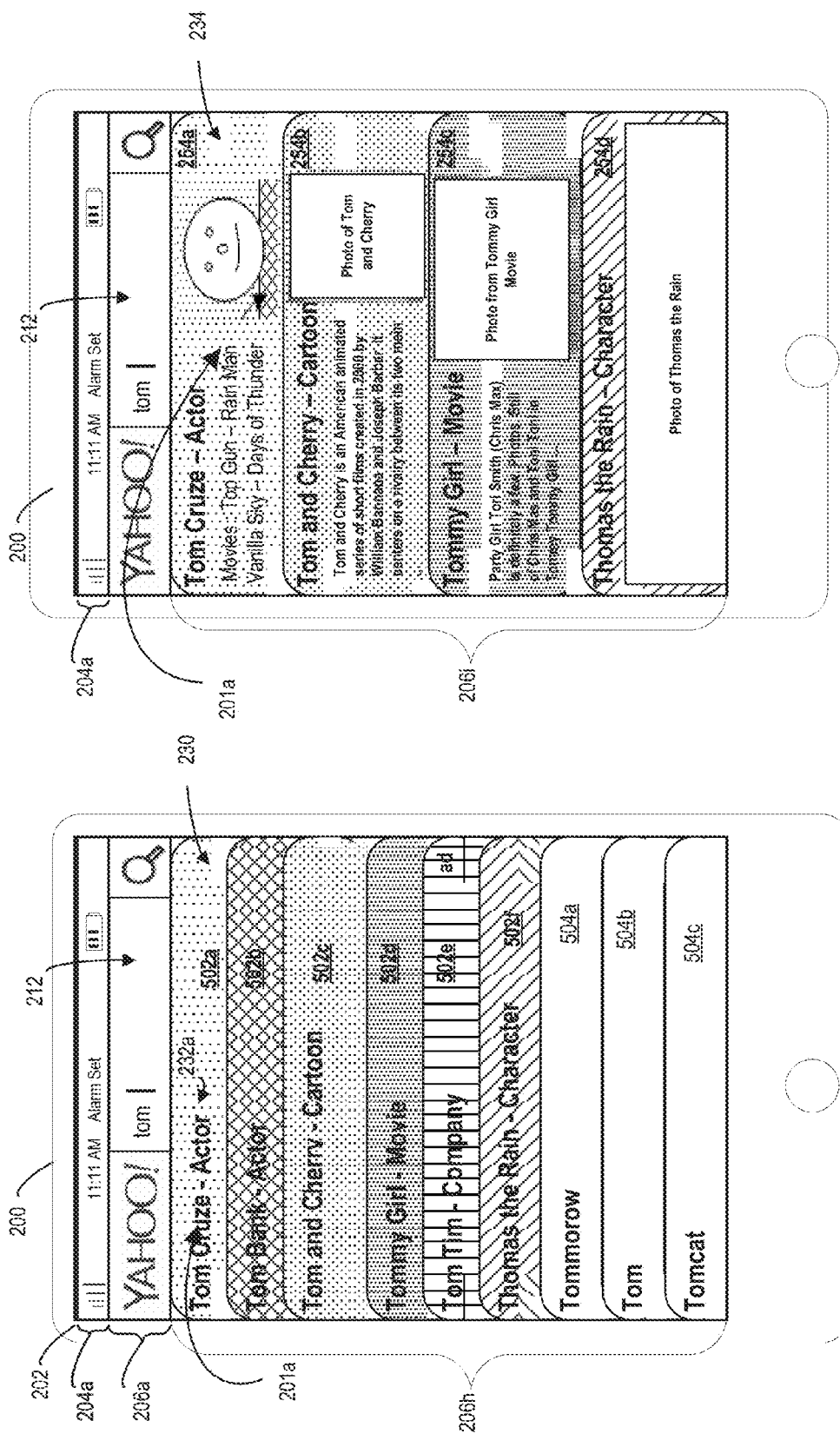

INTENT BASED SEARCH RESULTS ASSOCIATED WITH A MODULAR SEARCH OBJECT FRAMEWORK

BACKGROUND

This application relates to presentation of entity based content (such as entity search results and graphical user interfaces), modular search objects, and frameworks for supporting entity based content, modular search objects, and user interactions with the aforementioned.

It is common for users to enter a query consisting of one or more keywords and execute a search on a web page. Typically, search results are provided on a results page that gives a list of links with titles and some description of the linked contents. In many cases, the list of results is accompanied by one or more sponsored results (i.e., search advertisements).

Increasingly, users are executing searches on mobile devices, such as smartphones or tablets. The common technique of providing a list of results is not well adapted to the particular constraints of a mobile device. There is, therefore, a set of engineering problems to be solved in order to provide search results to users that are well adapted to mobile devices or mobile device interfaces to other devices (such as televisions).

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

FIG. 2a illustrates displayed entity and non-entity search result objects and search suggestion objects on an example page view rendered by an example client-side application, such as a mobile web browser. The example client-side application can be executed on any one of the client devices illustrated in FIG. 1.

FIG. 2b illustrates an example expanded displayed entity search result object associated with a person on an example page view rendered by the example client-side application of FIG. 2a. Specifically, this depiction of the expanded object includes an example summary section rendered by example summary circuitry of the modular search object framework.

FIG. 5a illustrates example displayed entity and non-entity search result objects, on an example page view rendered by the client-side application.

FIG. 5b illustrates example displayed and partially expanded entity search result objects, on an example page view rendered by the client-side application.

FIG. 8a also illustrates an example expanded displayed entity search result object.

FIG. 13 illustrates an example of a client device, such as the audience client device 124 in FIG. 1; and FIG. 14 illustrates an example of a server, such as the modular search framework server 116.

DETAILED DESCRIPTION

Figure 1:
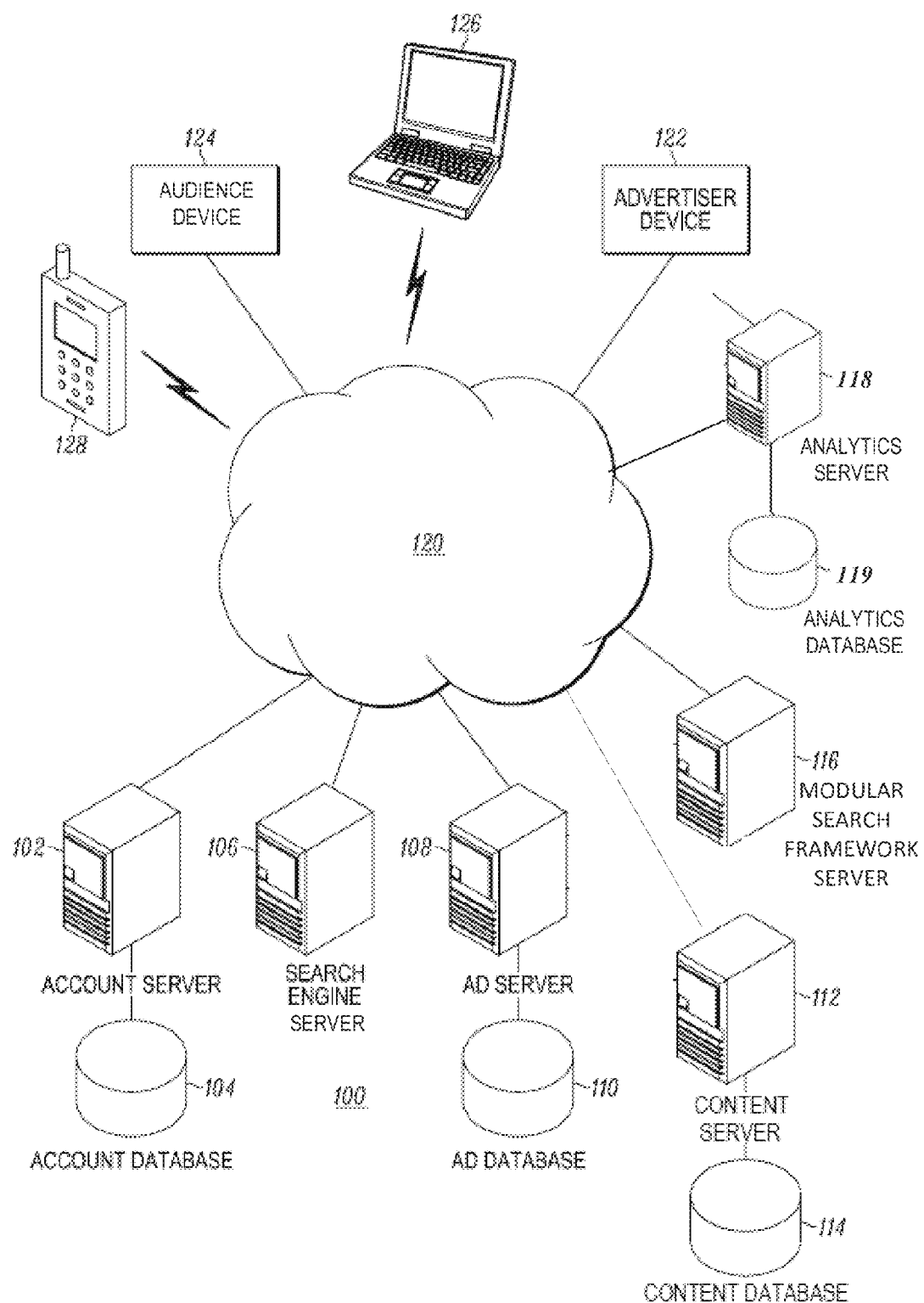
FIG. 1 illustrates a block diagram of an example information system that includes example devices of a network that can provide aspects of a modular search object framework.

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

OVERVIEW

Provided herein are novel systems, methods, and circuitry related to presentation of entity based content (such as entity search results and graphical user interfaces), modular search objects, frameworks for supporting entity based content and modular search objects, and user interactions with the aforementioned. The entity based content can be monetized. An entity search result is a search result that is based (such as based exclusively) on an entity (such as a particular person, place, or thing). An entity search result or other form of entity based content delivery, such as an entity graphical user interface (e.g., entity tray), is distinguishable from non-entity content in that in a system, such as a system of a content provider, content for a particular entity is delivered through a single root object made up of one or more sub-objects. With a non-entity search result, the result is not necessarily associated with one root object for a particular entity; there may be many root search results for a particular entity. Also, in a non-entity based system, there may be multiple root graphical user interfaces (GUIs), such as multiple root webpages, for a single entity. In an entity based content system, there is one root object per entity. In one example of an entity based system, there may be only one webpage per entity. For example, for the actor Tom Cruze, in such an entity based system there is only one root object for the actor Tom Cruze (such as one root webpage for Tom Cruze the actor). Whereas, in a non-entity based content system, there may be many root objects for the actor Tom Cruze. For example with a non-entity content delivery system, there may be many different root webpages and websites for the actor Tom Cruze. With an entity based content delivery system, there is only one root object. Given that there is only one root object per entity in the framework, there may be many entity sub-objects under the entity root object. WIKIPEDIA may be considered an entity based system of content delivery. One aspect of the framework described herein attempts to remove ambiguity with entities, which may be experienced with WIKIPEDIA. In an example of the framework, entities that may cause ambiguity in the system may be denied entry into the system.

In the framework, presentation of aggregated search results may be dynamic and interactive. Also, in the framework, entity search results (and even search suggestions and non-entity search results) may try to match the intent of the searcher, such as according to a search query entered by the searcher. Also, a user or group profile associated with the searcher may be used to determine user intent. The presentation of search results contained on multiple interactive objects may include links and other forms of information attached and viewable on an interactive object. Such information may include a summary on the entity and more. The information on such objects may include detailed information regarding the entity and links to related entities. Such information may be provided via one root graphical user interface (GUI) object per entity and sub-GUI objects of the root GUI object, such as information provided through an entity tray and cards within the tray. The entity root GUI object and each sub-GUI object may include various information regarding the entity or entities related to the entity. For example, a tray may be presented for a particular actor (such as tray 201a for Tom Cruze the actor), and a sub-GUI of the tray, such as a card, may present a map to a restaurant owned by the actor. The particular restaurant location of the restaurant owned by the actor may even be a place entity in the framework; and the restaurant in general may be a thing entity in the framework. In one example, the search results provided by the framework may appear as a list that appears as a stack of cards on a display device.

In the example where the framework presents a stack of cards search results or any other two- or three-dimensional form for a list of search results, such results may be graphically enhanced (such as photographically enhanced). Also, the framework results may be combined in a list with search suggestions. Furthermore, such a list may be interactive in that each object in the list may be moved, expanded, shrunken, minimized, and even hidden by a user interacting with the list. Entity search results in a list provided by the framework (opposed to non-entity search results and/or search suggestions) may be emphasized such as by graphical enhancement. The enhancement may even be tactile or through audio output or some other form of perceivable output.

Additionally or alternatively, the search results and other GUIs of the framework may organize results and information according to user intent. In an example, user intent can be predicted from an inputted search query. In such an example, corresponding search results can be listed in an order that reflects what the framework has predicted as the information the user intended to receive when inputting the search query. Also, user intent can be reflected in the arrangement and formatting of entity GUIs and sub-GUIs presented to the user. Also, information within an entity GUI may be arranged and formatted according to the predicted user intent.

DESCRIPTION OF THE DRAWINGS

FIG. 1 illustrates a block diagram of an example information system that includes example devices of a network that can provide a modular search object framework. The information system 100 in the example of FIG. 1 includes an account server 102, an account database 104, a search engine server 106, an ad server 108, an ad database 110, a content database 114, a content server 112, a modular search framework server 116 (which can also be communicatively coupled with a corresponding database), an analytics server 118, and an analytics database 119. The aforementioned servers and databases can be communicatively coupled over a network 120.

The information system 100 may be accessible over the network 120 by advertiser devices, such as an advertiser client device 122 and by audience devices, such as an audience client device 124. An audience device can be a client device that presents online content, such as entity and non-entity search results, search suggestions, content, and advertisements, to a user. In various examples of such an online information system, users may search for and obtain content from sources over the network 120, such as obtaining content from the search engine server 106, the ad server 108, the ad database 110, the content server 112, the content database 114, and the modular search framework server 116. Advertisers may provide advertisements for placement on electronic properties, such as webpages, and other communications sent over the network to audience devices, such as the audience client device 124. The online information system can be deployed and operated by an online services provider, such as Yahoo! Inc.

The account server 102 stores account information for advertisers. The account server 102 is in data communication with the account database 104. Account information may include database records associated with each respective advertiser. Suitable information may be stored, maintained, updated and read from the account database 104 by the account server 102. Examples include advertiser identification information, advertiser security information, such as passwords and other security credentials, account balance information, and information related to content associated with their ads, and user interactions associated with their ads and associated content. Also, examples include analytics data related to their ads and associated content and user interactions with the aforementioned. In an example, the analytics data may be in the form of one or more sketches, such as in the form of a sketch per audience segment, segment combination, or at least part of a campaign. The account information may include ad booking information. This booking information can be used as input for determining ad impression availability.

The account server 102 may be implemented using a suitable device. The account server 102 may be implemented as a single server, a plurality of servers, or another type of computing device known in the art. Access to the account server 102 can be accomplished through a firewall that protects the account management programs and the account information from external tampering. Additional security may be provided via enhancements to the standard communications protocols, such as Secure HTTP (HTTPS) or the Secure Sockets Layer (SSL). Such security may be applied to any of the servers of FIG. 1, for example.

The account server 102 may provide an advertiser front end to simplify the process of accessing the account information of an advertiser (such as a client-side application). The advertiser front end may be a program, application, or software routine that forms a user interface. In a particular example, the advertiser front end is accessible as a website with electronic properties that an accessing advertiser may view on an advertiser device, such as the advertiser client device 122. The advertiser may view and edit account data and advertisement data, such as ad booking data, using the advertiser front end. After editing the advertising data, the account data may then be saved to the account database 104.

Also, audience analytics, impressions delivered, impression availability, and segments may be viewed in real time using the advertiser front end. The advertiser front end may be a client-side application, such as a client-side application running on the advertiser client device. A script and/or applet (such as a script and/or applet) may be a part of this front end and may render access points for retrieval of the audience analytics, impressions delivered, impression availability, and segments. In an example, this front end may include a graphical display of fields for selecting an audience segment, segment combination, or at least part of a campaign. The front end, via the script and/or applet, can request the audience analytics, impressions delivered, and impression availability for the audience segment, segment combination, or at least part of a campaign. The information can then be displayed, such as displayed according to the script and/or applet.

The search engine server 106 and/or the modular search framework server 116 may be one or more servers. Alternatively, the search engine server 106 and/or the modular search framework server 116 may be a computer program, instructions, or software code stored on a computer-readable storage medium that runs on one or more processors of one or more servers. The search engine server 106 and/or the modular search framework server 116 may be accessed by audience devices, such as the audience client device 124 operated by an audience member over the network 120. Access may be through graphical access points. For example, query entry box (such as the query entry box 212 illustrated in FIGS. 2a-3a and 4a-7b and query entry box 820 illustrated in FIGS. 8a and 8b) may be an access point for the user to submit a search query to search engine server 106 and/or the modular search framework server 116, from the audience client device 124. Search queries submitted or other user interactions with the search engine server 106 and/or the modular search framework server 116 can be logged in data logs, and such logs may be communicated to the analytics server 118 for processing. After processing, the analytics server 118 can output corresponding analytics data to be served to the search engine server 106 and/or the modular search framework server 116 for determining entity and non-entity non-sponsored search results, entity and non-entity sponsored search results, and other types of content and ad impressions. Analytic circuitry may be used to determine analytics data, and such circuitry may be embedded in any one of the servers and client devices illustrated in FIG. 1.

Besides a search query, the audience client device 124 can communicate interactions with a search result and/or a search suggestion, such as interactions with a sub-GUI associated with the search result appearing on the same page view as the search result. Such interactions can be communicated to the search engine server 106, the modular search framework server 116, and/or the analytics server 118, for example. The search engine server 106 and/or the modular search framework server 116 locates matching information using a suitable protocol or algorithm and returns information to the audience client device 124, such as in the form of search suggestions, entity search results, and non-entity search results. An example of non-entity search results can include a list of webpage search results. Webpage search results may include a link to a corresponding webpage and a short corresponding blurb and/or text scraped from the webpage. The search engine server 106 and/or the modular search framework server 116 may receive the user interaction information, that can include search queries, from an audience device, and send corresponding information to the ad server 108 and/or the content server 112, and the ad server 108 and/or the content server 112 may serve corresponding ads and/or search results, but with more in-depth details or accompanying GUIs and sub-GUI for interacting with subject matter associated with ads, entity search results, and/or non-entity search results. The information inputted and/or outputted by these devices may be logged in data logs and communicated to the analytics server 118 for processing, over the network 120. The analytics server 118 can provide analyzed feedback for affecting future serving of content. For example, the analytics server 118 can provide feedback for affecting serving of ads, search suggestions, entity search results, non-entity search results, and respective GUIs (such as entity trays 201a-201d illustrated in FIGS. 2b-7b, respectively, and entity tray 801 illustrated in FIGS. 8a-8b) and sub-GUIs (such as summary sub-GUIs illustrated in FIGS. 2b, 6a, 6b, and 8a and miniature trays 318a-318c illustrated in FIG. 3a) included with and/or associated with the ads, search suggestions, entity search results, and non-entity search results.

The search engine server 106 and/or the modular search framework server 116 may be designed to help users and potential audience members find information located on the Internet or an intranet. In an example, the search engine server 106 and/or the modular search framework server 116 may also provide to the audience client device 124 over the network 120 an electronic property, such as a webpage and/or entity tray, with content, including search results, information matching the context of a user inquiry, links to other network destinations, or information and files of information of interest to a user operating the audience client device 124, as well as a stream or webpage of content items and advertisement items selected for display to the user. This information provided by the search engine server 106 and/or the modular search framework server 116 may also be logged, and such logs may be communicated to the analytics server 118 for processing, over the network 120. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

The search engine server 106 and/or the modular search framework server 116 may enable a device, such as the advertiser client device 122, the audience client device 124, or another type of client device, to search for files of interest using a search query, such as files associated with entity trays. Typically, the search engine server 106 and/or the modular search framework server 116 may be accessed by a client device via servers or directly over the network 120. The search engine server 106 and/or the modular search framework server 116 may include a crawler component, an indexer component, an index storage component, a search component, a ranking component, a cache, a user or group profile storage component, an entity storage component, a logon component, a user or group profile builder, an entity builder, and application program interfaces (APIs), such as APIs corresponding with the modular search framework. The search engine server 106 and/or the modular search framework server 116 may be deployed in a distributed manner, such as via a set of distributed servers, for example. Components may be duplicated within a network, such as for redundancy or better access.

The ad server 108 operates to serve advertisements to audience devices, such as the audience client device 124. An advertisement may include text data, graphic data, image data, video data, or audio data. Advertisements may also include data defining advertisement information that may be of interest to a user of an audience device. The advertisements may also include respective audience targeting information or ad campaign information, such as information on audience segments and segment combinations. An advertisement may further include data defining links to other online properties reachable through the network 120, such as entity trays and other types of properties related to entity trays. Also, an entity GUIs and other types of properties (such as entity trays and sub-GUIs related to entity trays) may be or include an advertisement. The aforementioned audience targeting information and the other data associated with an ad may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

For online service providers, advertisements may be displayed on electronic properties resulting from a user-defined search based, at least in part, upon search terms. Advertising may be beneficial to users, advertisers or web portals if displayed advertisements are relevant to audience segments, segment combinations, or at least parts of campaigns. Thus, a variety of techniques have been developed to determine corresponding audience segments or to subsequently target relevant advertising to audience members of such segments. For example user interests, user intentions, and targeting data related to segments or campaigns may be may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

One approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. The aforementioned targeting data, such as demographic data and psychographic data, may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

Another approach includes profile-type ad targeting. In this approach, user or group profiles specific to a respective user or group may be generated to model user behavior, for example, by tracking a user's path through a website or network of sites, and compiling a profile based, at least in part, on entity GUIs (such as entity trays), webpages, and advertisements ultimately delivered. A correlation may be identified, such as for user purchases, for example. An identified correlation may be used to target potential purchasers by targeting content or advertisements to particular users. The aforementioned profile-type targeting data may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

Yet another approach includes targeting based on content of an electronic property requested by a user, such as content of an entity GUI (such as an entity tray) or webpage requested by a user. Advertisements may be placed on an electronic property or in association with other content that is related to the subject of the advertisements. The relationship between the content and the advertisement may be determined in a suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

The ad server 108 includes logic and data operative to format the advertisement data for communication to a user device, such as an audience member device. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements and/or audience segments. The aforementioned ad formatting and pricing data may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

The advertising data may be formatted to an advertising item that may be included in a stream of content items and advertising items provided to an audience device. The formatted advertising items can be specified by appearance, size, shape, text formatting, graphics formatting and included information, which may be standardized to provide a consistent look and feel for advertising items in the stream. Such a stream may be included in or combined with an entity GUI (such as an entity tray). Also, a related entity GUI can include a similar appearance, size, shape, text formatting, graphics formatting and included information to provide a consistent look and feel between the entity GUI and the stream. Additionally, aforementioned formatting data may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

Further, the ad server 108 is in data communication with the network 120. The ad server 108 communicates ad data and other information to devices over the network 120. This information may include advertisement data communicated to an audience device. This information may also include advertisement data and other information communicated with an advertiser device, such as the advertiser client device 122. An advertiser operating an advertiser device may access the ad server 108 over the network to access information, including advertisement data. This access may include developing advertisement creatives, editing advertisement data, deleting advertisement data, setting and adjusting bid amounts and other activities. This access may also include a portal for interacting with, viewing analytics associated with, and editing parts of entity GUIs (such as entity trays) the advertiser at least partially controls or owns. The ad server 108 then provides the ad items and/or entity GUIs to other network devices, such as the modular search framework server 116, the analytics server 118, and/or the account server 102, for classification (such as associating the ad items and/or entity GUIs with audience segments, segment combinations, or at least parts of campaigns). This information can be used to provide feedback for affecting serving of ads, search suggestions, entity search results, non-entity search results, and respective GUIs and sub-GUIs included with and/or associated with the ads, search suggestions, entity search results, and non-entity search results.

The ad server 108 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 110 for subsequent communication in advertisements to an audience device.

The ad server 108, the content server 112, or any other server described herein may be one or more servers. Alternatively, the ad server 108, the content server 112, or any other server described herein may be a computer program, instructions, and/or software code stored on a computer-readable storage medium that runs on one or more processors of one or more servers. The ad server 108 may access information about ad items either from the ad database 110 or from another location accessible over the network 120. The ad server 108 communicates data defining ad items and other information to devices over the network 120. The content server 112 may access information about content items either from the content database 114 or from another location accessible over the network 120. The content server 112 communicates data defining content items and other information to devices over the network 120. Content items and the ad items may include any form of content included in ads, search suggestions, entity search results, non-entity search results, and respective GUIs and sub-GUIs included with and/or associated with the ads, search suggestions, entity search results, and non-entity search results.

The information about content items may also include content data and other information communicated by a content provider operating a content provider device, such as respective audience segment information and possible links to entity search results, trays, and other types of entity GUIs. A content provider operating a content provider device may access the content server 112 over the network 120 to access information, including the respective segment information, entity search result information, and entity GUI information. This access may be for developing content items, editing content items, deleting content items, setting and adjusting bid amounts and other activities, such as associating content items with audience segments, segment combinations, or at least parts of campaigns. A content provider operating a content provider device may also access the analytics server 118 over the network 120 to access analytics data. Such analytics may help focus developing content items, editing content items, deleting content items, setting and adjusting bid amounts, and activities related to distribution of the content, such as distribution of content via entity search results and GUIs (such as entity trays).

The content server 112 may provide a content provider front end to simplify the process of accessing the content data of a content provider. The content provider front end may be a program, application or software routine that forms a user interface. In a particular example, the content provider front end is accessible as a website with electronic properties that an accessing content provider may view on the content provider device. The content provider may view and edit content data using the content provider front end. After editing the content data, such as at the content server 112 or another source of content, the content data may then be saved to the content database 114 for subsequent communication to other devices in the network 120, such as devices administering entity search results and GUIs.

The content provider front end may be a client-side application, such as a client-side application running on the advertiser client device or the audience client device, respectively. A script and/or applet, such as the script and/or applet, may be a part of this front end and may render access points for retrieval of impression availability data (such as the impression availability data), and the script and/or applet may manage the retrieval of the impression availability data. In an example, this front end may include a graphical display of fields for selecting audience segments, segment combinations, or at least parts of campaigns. Then this front end, via the script and/or applet, can request the impression availability for the audience segments, segment combinations, or at least parts of campaigns. The analytics can then be displayed, such as displayed according to the script and/or applet. Such analytics may also be used to provide feedback for affecting serving of ads, search suggestions, entity search results, non-entity search results, and respective GUIs and sub-GUIs included with and/or associated with the ads, search suggestions, entity search results, and non-entity search results The content server 112 includes logic and data operative to format content data for communication to the audience device. The content server 112 can provide content items or links to such items to the analytics server 118 and/or the modular search framework server 116 for analysis or associations with entities, respectively. For example, content items and links may be matched to data and circuitry, such as entity data and circuitry and even module circuitry and data (e.g., module circuitry 910 in FIG. 9). The matching may be complex and may be based on historical information related to the audience segments and impression availability.

The content data may be formatted to a content item that may be included in a stream of content items and advertisement items provided to an audience device. The formatted content items can be specified by appearance, size, shape, text formatting, graphics formatting and included information, which may be standardized to provide a consistent look and feel for content items in the stream. Such a stream may be included in or combined with an entity GUI (such as an entity tray). Also, a related entity GUI can include a similar appearance, size, shape, text formatting, graphics formatting and included information to provide a consistent look and feel between the entity GUI and the stream. Additionally, aforementioned formatting data may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

In an example, the content items may have an associated bid amount that may be used for ranking or positioning the content items in a stream of items presented to an audience device. In other examples, the content items do not include a bid amount, or the bid amount is not used for ranking the content items. Such content items may be considered non-revenue generating items. The bid amounts and other related information may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

The aforementioned servers and databases may be implemented through a computing device. A computing device may be capable of sending or receiving signals, such as over a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views, entity search results and GUIs (such as entity trays), or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). Such sites may be integrated with the framework via the modular search framework server 116. An online server system may also host a variety of other sites, including, but not limited to business sites, educational sites, dictionary sites, encyclopedia sites, wikis, financial sites, government sites, etc. These sites, as well, may be integrated with the framework via the modular search framework server 116.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 120 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, may employ differing architectures or may be compliant or compatible with differing protocols, and may interoperate within a larger network, such as the network 120.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

The advertiser client device 122 includes a data processing device that may access the information system 100 over the network 120. The advertiser client device 122 is operative to interact over the network 120 with any of the servers or databases described herein. The advertiser client device 122 may implement a client-side application for viewing electronic properties and submitting user requests. The advertiser client device 122 may communicate data to the information system 100, including data defining electronic properties and other information. The advertiser client device 122 may receive communications from the information system 100, including data defining electronic properties and advertising creatives. The aforementioned interactions and information may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

In an example, content providers may access the information system 100 with content provider devices that are generally analogous to the advertiser devices in structure and function. The content provider devices provide access to content data in the content database 114, for example.

The audience client device 124 includes a data processing device that may access the information system 100 over the network 120. The audience client device 124 is operative to interact over the network 120 with the search engine server 106, the ad server 108, the content server 112, and the analytics server 118, and the modular search framework server 116. The audience client device 124 may implement a client-side application for viewing electronic content and submitting user requests. A user operating the audience client device 124 may enter a search request and communicate the search request to the information system 100. The search request is processed by the search engine and search results are returned to the audience client device 124. The aforementioned interactions and information may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

In other examples, a user of the audience client device 124 may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the audience client device 124. The aforementioned interactions and information may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

The advertiser client device 122 and the audience client device 124 operate as a client device when accessing information on the information system 100. A client device, such as the advertiser client device 122 and the audience client device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like. In the example of FIG. 1, both laptop computer 126 and smartphone 128, which can be client devices, may be operated as either an advertiser device or an audience device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example.

A client device, such as the advertiser client device 122 and the audience client device 124, may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or video games. The foregoing is provided to illustrate that claimed subject matter is intended to include a wide range of possible features or capabilities. At least some of the features, capabilities, and interactions with the aforementioned may be logged in data logs and such logs may be communicated to the analytics server 118 for processing. Once processed into corresponding analytics data, the analytics server 118 can provide analyzed feedback for affecting future serving of content. For example, the analytics server 118 can provide feedback for affecting serving of ads, search suggestions, entity search results, non-entity search results, and respective GUIs and sub-GUIs included with and/or associated with the ads, search suggestions, entity search results, and non-entity search results.

Also, the disclosed methods and systems may be implemented at least partially in a cloud-computing environment, at least partially in a server, at least partially in a client device, or in any combination thereof.

Figure 6B:
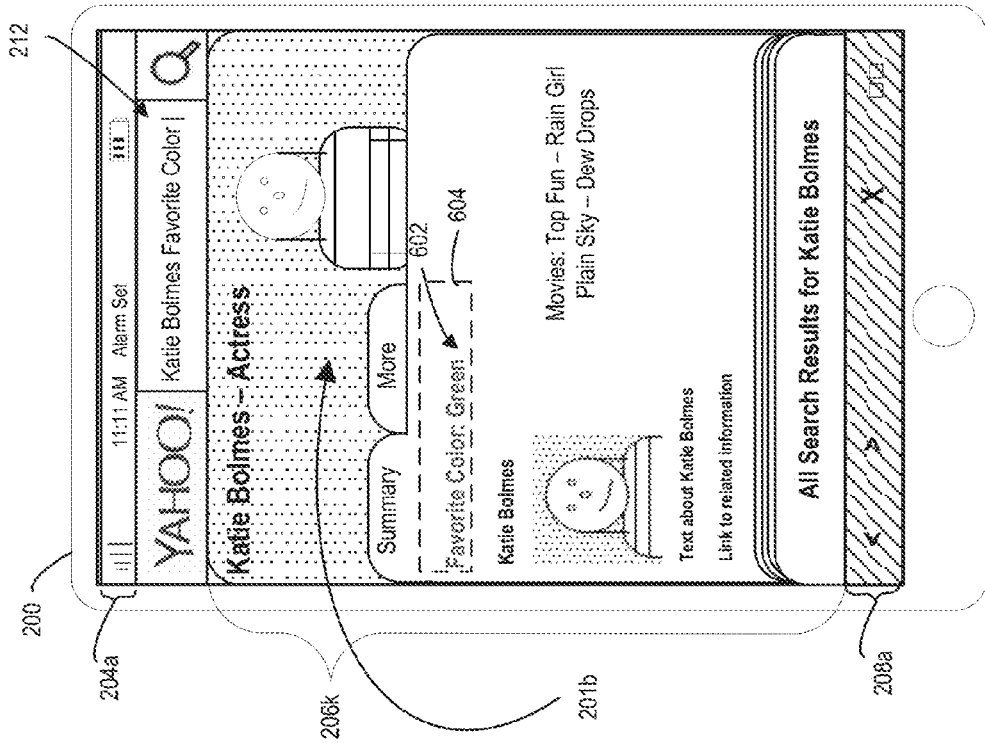
FIG. 6b illustrates an example expanded displayed entity search result object on an example page view rendered by the client-side application. Specifically, this depiction of the expanded object includes an example summary section and an example predicted answer section rendered by respective circuitry of the modular search object framework.
Figure 6A:
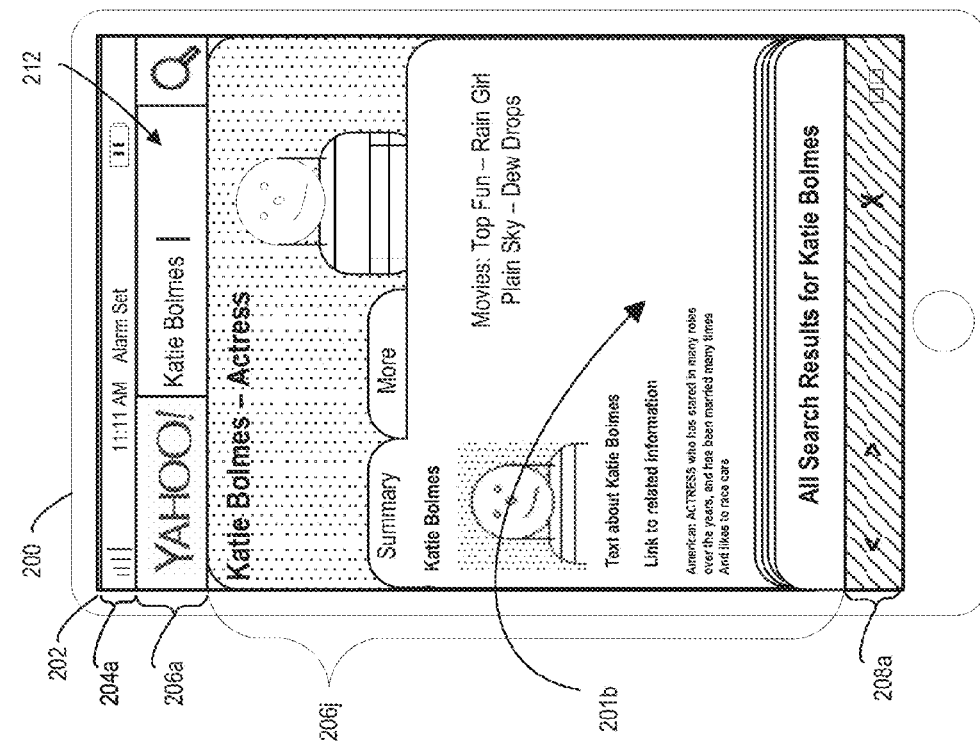
FIG. 6a illustrates an example expanded displayed entity search result object on an example page view rendered by the client-side application. Specifically, this depiction of the expanded object includes an example summary section rendered by example summary circuitry of the modular search object framework.
Figure 7B:
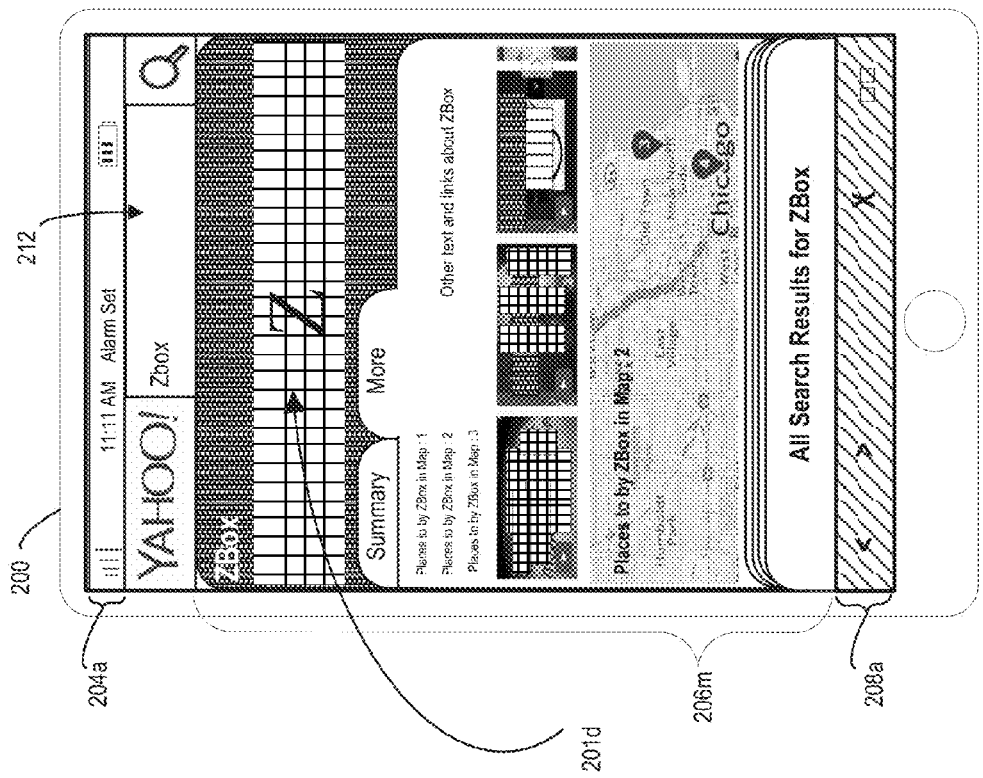
FIG. 7b illustrates an example expanded displayed entity search result object associated with a thing. Specifically, this depiction of the expanded object associated with a thing includes multiple interactive sections rendered by respective circuitry of the modular search object framework.
Figure 7A:
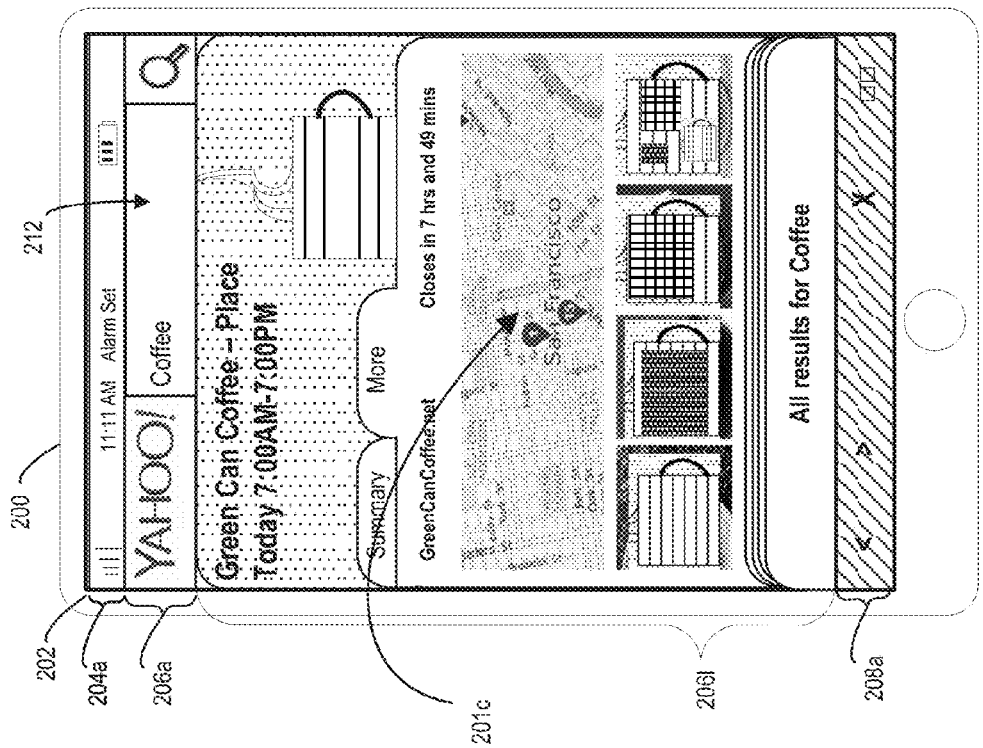
FIG. 7a illustrates an example expanded displayed entity search result object associated with a place. Specifically, this depiction of the expanded object associated with a place includes multiple interactive sections rendered by respective circuitry of the modular search object framework.
Figure 8A:
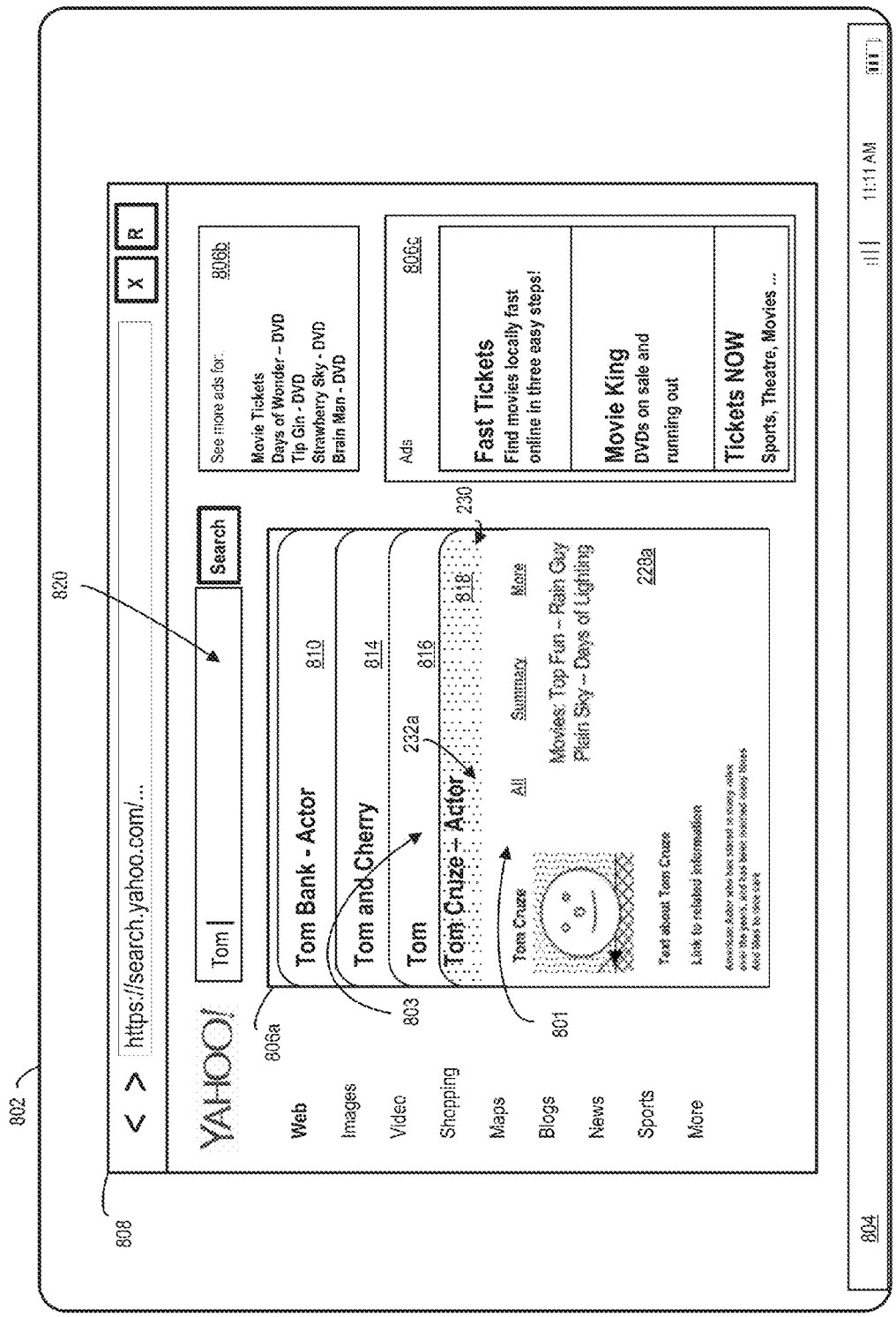
FIG. 8a illustrates example displayed entity and non-entity search result objects and search suggestion objects, on an example page view rendered by an example client-side application, such as a web browser. Such a client-side application can be executed on any one of the client devices illustrated in FIG. 1.
Figure 8B:
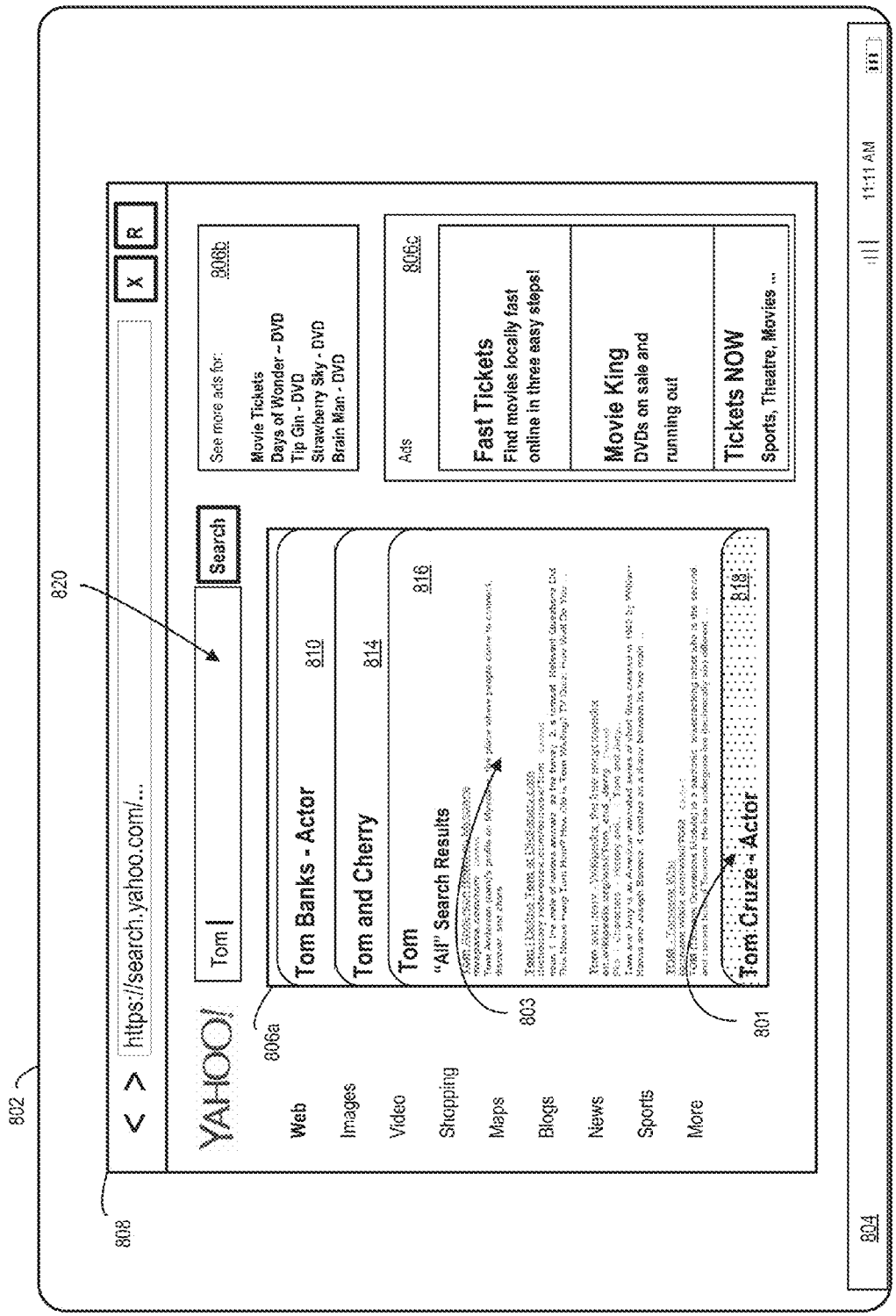
FIG. 8b illustrates an example expanded displayed search suggestion object associated with an example suggested search term on an example page view rendered by the client-side application of FIG. 8a. Specifically, this depiction of the expanded object includes an example webpage based search results section rendered by respective circuitry of the modular search object framework.

FIGS. 2a-8b illustrate screen presentations that can be provided by the modular search object framework. In FIGS. 2a-7b, the screen presentations are depicted as displayed on a display 202 of a client mobile device 200. In FIGS. 8a and 8b, the screen presentations are depicted as displayed on a display 802 of or coupled with a client device, such as a display associated with a personal computer or a smart television. The displays 202 and 802 may each include a touchscreen configured to receive user input, such as touch gestures.

Within the screen presentations, illustrated are graphical user interfaces (GUIs) provided by the framework and GUIs provided by a native operating system and/or a native client-side application, such as a web browser. For example, section 204a and touchscreen keyboard 204b in FIG. 2a of the screen presentations are GUI parts provided by a native operating system of the client mobile device 200. Section 804 in FIGS. 8a and 8b is a GUI part provided by a native operating system of the client device associated with the display 802. Also, for example, section 206a in FIGS. 2a-3a and 5a-7b of the screen presentations is a GUI part provided by the framework and/or a service provider associated with the framework, and sections 206b-206m in FIGS. 2a-7b are GUI parts provided by the framework. Also, for example, section 208a in FIGS. 2b, 3a, and 6a-7b is a GUI part provided by the native client-side application executed on the client mobile device 200. In FIGS. 8a and 8b, web browser 808 is a GUI provided by a native web browser application executed on the client device associated with the display 802. Section 806a is a GUI part provided by the framework, and sections 806b and 806c are GUI parts provide by the framework and/or a service provider associated with the framework.

In an example, GUI parts such as 204b, 206a, and 208a may be hidden by the native operating system, the native client-side application, the framework, or any combination thereof, so that GUI parts provided by the framework such as sections 206b-206m may be displayed on a greater amount of space on the display 202. Even the GUI part 204a may be hidden. See FIG. 3b for an example result of such functionality. This functionality of hiding GUI parts may occur when a user's finger, such as finger 306 in FIG. 3b, interacts with a GUI part within a section provided by the framework, such as section 206e. In an example, this functionality and other object movement is enhanced, in that movement and the hiding occurs seamlessly without unwanted visual artifacts, because the native operating system, the native client-side application, and the framework are closely coupled. For example, circuitry that controls such functionality can be a combination of circuitry of the native operating system, the native client-side application, and the framework, which exists in the host device, such as the mobile client device 200 or the client device associated with the display 802.

In an example, GUI parts provided by the framework may interact with GUI parts provided by the native client-side application and the native operating system. These interactions occur seamlessly because of the existence of associated circuitry being local to the client device displaying the GUI parts. Transitions between the various page views and section display changes are illustrated in FIGS. 2a-7b and FIGS. 8a-8b can occur without unwanted visual artifacts due to tight coupling between circuitry of the native operating system, the native client-side application, and the framework. For example, parts of the circuitry can include client-side code such as AJAX, JavaScript, or any combination thereof.

Alternatively or additionally, the framework may provide animations, including intentional visual artifacts, to provide a visually pleasing transition when transitioning from one displayed feature to another. For example, one theme for visual presentation of the GUI parts of the framework and optionally GUI parts interacting with or displayed simultaneously with the GUI parts of the framework, can include a card theme. For example, the card theme can include GUI sections that include boundaries with curved corners, and GUI sections that can overlap with each other to give the appearance that each section is a card with curved corners. The transitions between various visual displays by the framework can include animations including rearranging of cards, such as shuffling of cards. Alternatively or additionally, the animations can include moving cards into and out of a deck of cards. The deck may include partial fanning in straight and/or rotational directions in a three dimensional graphical space. The animations for a transition can include fanning cards in a deck horizontally along an x-axis, vertically along a y-axis, in or out of the screen along a z-axis, rotationally around any one or combination of the x-, y-, z-axes, or any combination thereof.

For example, FIG. 2a shows cards fanned out in a vertical direction along a y-axis relative to the display 202. FIG. 2b shows one card drawn out of a deck of cards 210 partially fanned out vertically. In a transition between the displaying of section 206b to section 206c, the fanned out cards of section 206b may retract into the deck of cards 210 displayed in section 206c, vertically. The cards labeled "summary" and "more" of respective sections 206c and 206d in FIGS. 2b and 3a, when transitioning from one card to another may merely flash from one card to another. Alternatively, transitions of such cards may include an animation including the card moving in and/or out of the deck of cards 210. The animation may also include a shuffling of the deck 210. Animation with a shuffling of the deck 210 may also occur when a search query occurs, such as the query entered into the search query box 212. For example, when the framework transitions from providing information on Tom Cruze in FIGS. 2a-5b to providing information on Katie Bolmes in FIGS. 6a-6b, the deck of cards 210 may shuffle to give the appearance that the deck of cards is being shuffled to find cards related to Katie Bolmes. Such an animation may also occur when a link or button is clicked that leads to a transition from one entity to another. Also, when a query is entered or at least partially entered, such an action may cause a transition from one entity to another.

In an example, transitions within an entity may occur with relatively simple animations, such as flashing between cards, scrolling through related cards arranged side-by-side in a tray of cards in a single direction, or moving one or a few cards at least partially in and out of a deck, per user interaction with the respective entity GUI. Transitions from an entity to another entity may include relatively more complex animations, such as a shuffling of the deck of cards. In some examples, shuffling may occur either between transitions within an entity or from one entity to another; however, in such examples, the shuffling for transitions within an entity may occur for a noticeably less amount of time than the shuffling between entity changes. For example, shuffling due to transitions within an entity may be less than one second, and shuffling due to transitions between entities may be more than 2 seconds.

FIGS. 2a-8b show example screens of navigation of content, such as online content, emphasizing various features provided by the framework. FIG. 2a, shows text "tom" entered into a search query box 212 via the keyboard 204b. Alternatively, the text may be inputted through a voice command or some other form of user input. Upon entering of "tom" into the box or upon entering "tom" and clicking on the search execution button 214, search suggestions and/or search results can appear on the display 202 within section 206b. For example, upon entering "tom" into the box 212, but before clicking on the search execution button 214, search topic suggestions may appear, such as search suggestions 216 and 218 in FIG. 2a. A user may select one of these suggestions, which causes execution of a query using the respective text displayed with the suggestion. In this example, the suggestions appear as cards. These suggestion cards may have a similar color and texture scheme, and the scheme may be simple, such as one solid color or a spectrum of colors within a range of a full spectrum of colors. For example, the suggestion cards may each be various shades of blue. Also, upon entering "tom" into the box 212, actual search results may appear, such as search results associated with a specific entity, such as a particular person, place, or thing. In this example, the entity search results include search results 220, 222, and 224 in FIG. 2a. These results appear as cards. These search result cards may have different color and texture schemes, and may include schemes associated with a photograph, such as a photograph bled out onto a card. This visual feature helps a user distinguish between a search result card, such as an entity search result card, and a search suggestion card (and optionally a non-entity search result card). Where a search is actually executed, and search results are displayed (such as in sections 206h of FIGS. 5a and 206i of FIG. 5b), an entity search result can be visually distinguished from a set of non-entity search results, such as a set of webpage search results, by the color and texture scheme of the cards representing the results. For example, a simple one color range theme may represent a set of webpage search results, whereas a more complex theme, such as a bled out photograph, may represent an entity search result. In FIG. 5a, entity search results 502a-502f are visually distinguishable from webpage based search results 504a-504c.

In the example shown in FIGS. 2a and 2b, a user may select one of the search results (entity search result 220, 222, or 224) shown in FIG. 2a, which causes the page view to transition from displaying the fanned out search results and suggestions to a full-size card including information on the selected entity, such as shown in FIG. 2b. For example, a user may have selected the entity search result 220, labeled with "Tom Cruze—Actor", resulting in the display of a full-size card for the entity, Tom Cruze, the actor. A full-size card is a card that includes the graphical functionality of an entity tray. In other words, a full-size card may be a primary GUI for an entity tray.

Full-size entity cards, such as cards displayed for Tom Cruze (e.g., cards within sections 206c-206g), provide information specific to that entity or entities related to that entity. Besides a specific person (a real person or a fictional character), entities may include any particular place or thing. For example, section 206l in FIG. 7a depicts a place entity card for the entity Green Can Coffee. Section 206m in FIG. 7b depicts a thing entity (in particular a product entity), for the entity ZBOX.

Various versions of ZBOX may have their own full-size cards and entity trays. In this sense, there is an expansive hierarchy and network of entities. Within the expansive hierarchy and network, people, places, and things may have various types of relationships. For example, these relationships may include object relationships such as from the perspective of an object hierarchy including relationships between generic items and specific items, such as ZBOX in general and specific versions of ZBOX. This object hierarchy applies to places as well. For example, Green Can Coffee, may be a thing (a company) in general, but each location of Green Can Coffee is a specific place. The generic thing can be related the specific places, and such relationships may be outputted for user navigation through associated links.

Referring back to FIG. 2b, depicted is a full-size card 226 for Tom Cruze the actor. Within in the full-size card 226, there are many parts viewable and hidden. Overlapping the full-size card are two sub-cards 228a and 228b, a card labeled "summary" and a card labeled "more", respectively (hereinafter referred to as a summary card and a "more" card). The full-size card 226 and the two sub-cards 228a and 228b are extended out from the deck of cards 210. The section 206c which includes the deck of cards 210 and any card extended out from the deck can also be referred to as an entity tray. The section 206b overlapped by the keyboard 204b may also encompass a tray 203 for at least cards 216-224. A tray can be associated with at least a partial and even an unexecuted search query. For example, sections 206b, 206h, and 206i encompass a tray associated with the search term "tom". Sections 206c-206g encompass a tray 201a associated with the searched entity, Tom Cruze the actor. Sections 206j-206k encompass a tray 201b associated with the searched entity, Katie Bolmes, the actress. Section 2061 encompasses a tray 201c associated with the searched entity, Green Can Coffee, a place entity. Section 206m encompasses a tray 201d associated with the search entity, ZBOX, a thing entity. FIGS. 8a-8b, section 806a includes a tray 801 associated with Tom Cruze the actor. Also, in FIGS. 8a-8b, section 806a encompasses a tray 803 associated with the search term "tom".

With a full-size card, presentations associated with at least one module circuitry may appear. Each module has respectively circuitry configured to execute various aspects of the module. In FIG. 2b, depicted is a GUI rendered by an entity summary module. This summary GUI includes summary information regarding the selected entity. In FIG. 2b, the selected entity is Tom Cruze. The information that appears in the summary GUI may be scraped information, information from a content database, information selected by a party that is responsible for editing the information, information selected by machine learning, or any combination thereof. Such information may include most sought out information for the selected entity. Most sought out information may be gathered from online search logs and other logs pertaining to web browsing. The information may be updated in various intervals. The length of time between updates may be based on an amount the entity summary is requested for the selected entity. The information within the entity summary may be plain text or hypertext that links to other entities or initiates a search related hypertext when the hypertext is selected.

Also, depicted in FIG. 2b, a theme may be rendered by an entity theme module circuit. The entity theme module circuitry may include visual and instrumental settings for the tray associated with the selected entity. For example, trays can look, feel, and operate differently. Such settings may include the backdrop of the tray. A backdrop may include a photograph associated with the entity, such as a photograph including the entity, fitted to a section encompassing the tray. FIGS. 2b-4b show at least part of the backdrop 230 for the entity Tom Cruze. The backdrop 230 includes a label 232a for the entity Tom Cruze the actor and a photo image of Tom Cruze 232b. Besides the tray for Tom Cruze the actor, the search result card for Tom Cruze includes part of the backdrop 230 (See FIGS. 2a and 5a). Also, the backdrop can be modified by the backdrop module circuit, such as modified according to the format of search results (See part of modified backdrop 234 in FIG. 5b).

Figures 3A, 3B:
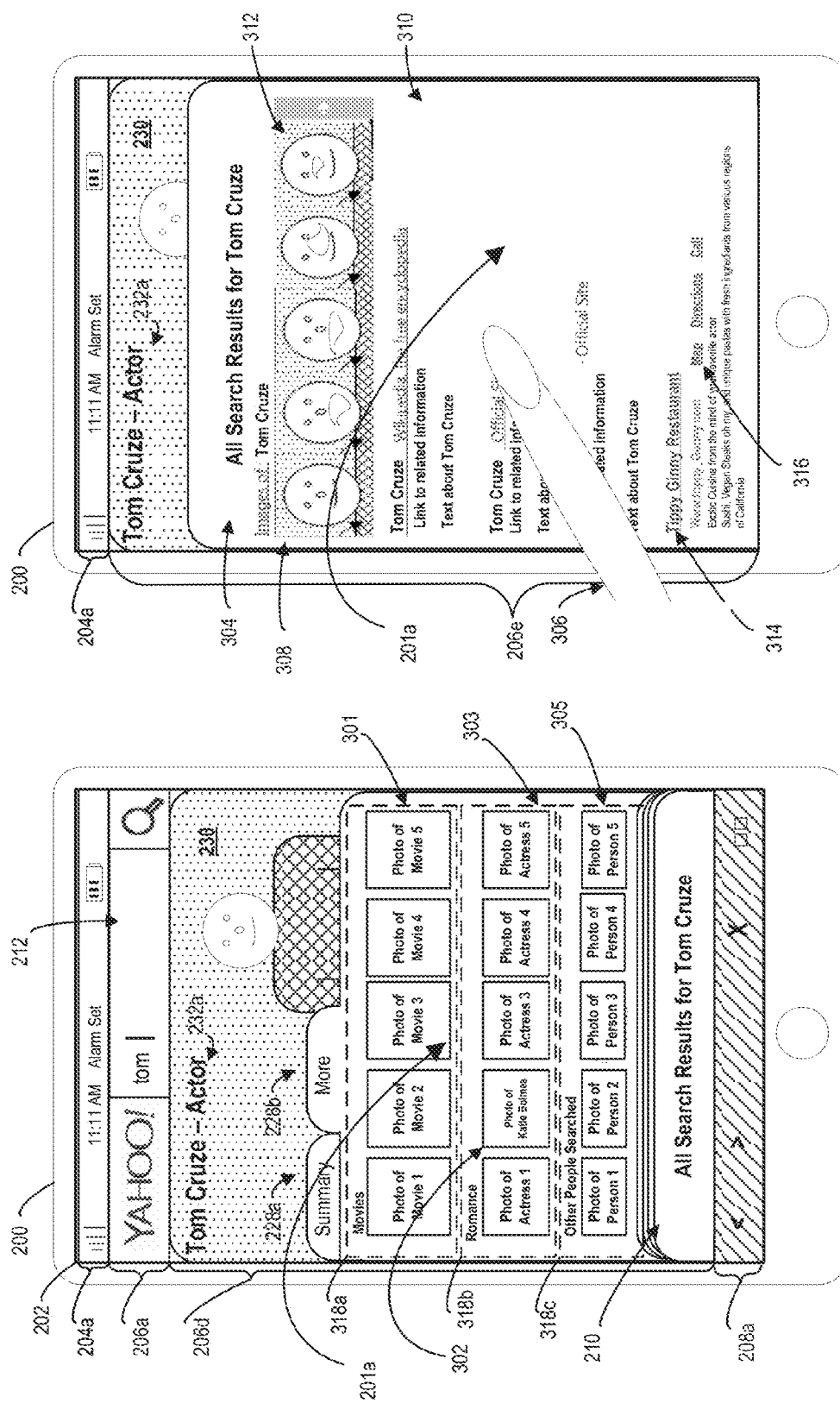
FIG. 3a illustrates the example expanded displayed entity search result object of FIG. 2b. Specifically, this depiction of the expanded object includes multiple interactive sections rendered by respective circuitry of the modular search object framework.
FIG. 3b illustrates the example expanded displayed entity search result object of FIG. 2b overlapped by an example image based search results section and an example webpage based search results section rendered by respective circuitry of the modular search object framework.

At the screen in FIG. 2b, a user can select the tab associated with the "more" card 228b. This may cause the tray for Tom Cruze the Actor to transition from the summary card 228a to the "more" card 228b. The displaying of the "more" card 228b is illustrated in FIG. 3a. The "more" card 228b includes a GUI rendered by a "more" module circuit. This "more" GUI includes information regarding the selected entity. As depicted, the information of the "more" GUI can be displayed through sub-GUIs associated with different categories and modules circuits associated with the different categories. Each sub-GUI can be rendered by one or more related module circuitry. The "more" module circuitry can include configuration information, such as presentation configuration information for the module and sub-modules within the module. For example, in the FIG. 3a, some sub-modules are presented as scrollable miniature trays 318a-318c with respective miniature cards displayed side-by-side. For example, in the touchscreen context miniature cards within a miniature tray can be cycled through by swiping the tray in a corresponding direction.

The "more" module circuitry can also include configuration information relevant to which sub-module GUIs to include with the "more" module GUI. For example, in FIG. 3a, at least sub-modules circuits for related movies, romantically related people, and generally related people have been selected to be included with the "more" module circuitry for Tom Cruze the actor. The "more" module circuitry for Tom Cruze the actor is a combination of the "more" module circuitry and entity circuitry for Tom Cruze, in communication with each other. The selection of sub-module circuitry per module circuitry may be global across all entities, particular per entity type, particular per entity, or any combination thereof. For example, in the "more" module circuitry, the "people also searched" module circuitry may be included across people entities but not places and things entities. Whereas, for example, "images" module sub-GUI (as shown displayed in FIG. 3b as the sub-GUI 308) may be universally selected across all types of entities. The "Romance" module sub-GUI may be included just for the instance of the "more" module GUI for Tom Cruze or any other person with multiple known intimate relationships and/or ex-spouses.

The selection of sub-modules GUIs may be based on various sources, such as information scraped from partner websites and information from a content database, such as a database storing search logs having information pertaining to most common categories searched along with queries for a particular entity. For example, search logs may show it is likely that the intent of users querying for information on Tom Cruze are also looking for information on movies that Tom Cruze appeared. Also, an owner, such as an owner advertiser, associated with the Tom Cruze entity tray, may manually select the sub-module GUIs to include with a particular module GUI, such as the "more" module GUI. There are benefits to using machine learning to predict intentions of users querying an entity and using the predictions to select sub-modules for that module circuitry. Actually, various aspects of an entity tray may be determined based on such predicted intentions of users searching for the entity associated with the entity tray. For example, machine learning can be used to determine predicted information and information desired by the user to be displayed anywhere on an entity GUI. Such information can be determined according to historical online user interaction data that can include data pertaining to clicks, searches, dwell times, or any combination thereof.

In FIG. 3a, the selected entity is still Tom Cruze. The information that appears in the "more" GUI may be scraped information, information from a content database, information selected by a party that is responsible for editing the information, information selected by machine learning, or any combination thereof. Such information may include most sought out information for the selected entity per category associated with the presented sub-GUIs. The most sought out categorical information and detailed information pertaining to each category for the entity may be gathered from online search logs and other logs pertaining to web browsing. The categorical information and the detailed information may be updated in various intervals. The length of time between updates to each sub-GUI may be based on an amount that sub-GUI is requested for the selected entity. The information within the entity may be images and/or text and may include hyperlinks to other entities or that initiate related searches. For example, a user may select one of the movie images in the movie sub-GUI 301, and this may initiate a search with respect to the movie or navigation to an entity tray for that movie if it exists within the framework. Also, as depicted, a user may select one of the people images in the romance sub-GUI 303 or the "people also search for" sub-GUI 305, and this may initiate a search with respect to the selected person or navigation to an entity tray for that person.

As depicted, a user may select one of the images associated with one of the romances of Tom Cruze, such as the image labeled "Katie Bolmes" 302. This may cause the GUI of the framework to swap out the tray 201a for Tom Cruze the actor with the tray 201b in FIGS. 6a and 6b for Katie Bolmes the actress. The displaying of the tray 201b for Katie Bolmes the actress is illustrated in FIGS. 6a and 6b. FIG. 6a includes a summary card for Katie Bolmes the actress rendered on the tray. In an example, the default landing page or sub-card of a tray is the summary card. Also, depicted in FIG. 6a is a change in the label of the deck of cards to "All search results for Katie Bolmes" instead of "All search results for Tom Cruze". Also, the text in the search box 212 may be changed automatically to text associated with the destination entity. In this case, the navigation from the Tom Cruze tray 201a to the Katie Bolmes tray 201b causes a change in the label on the deck of cards and a change of the text in the search box to text including Katie Bolmes instead of Tom Cruze.

In FIG. 6b, a text string "Favorite Color" has been entered into the search box along with "Katie Bolmes". This additional text may be predicted to be a question associated with entity predicted for the search text. In this case, the framework is predicting, through a question prediction module, that the user is interested in the favorite color of Katie Bolmes the actress. The question prediction module circuitry may be coupled with a question answering module circuitry can be configured to search out an answer to the predicted question. In FIG. 6b, it is shown that the question answering module circuitry is configured to output an answer 602 to a position for answers 604 at the top of the summary card for Katie Bolmes.

Referring back to FIG. 3a, a user may select the deck of cards 210, such as by clicking on or swiping upwards beginning at the text "All search Results for Tom Cruze". This may cause the tray 201a for Tom Cruze the Actor to transition from the "more" card 228b to the "all search results" card 304 in FIG. 3b. The displaying of the "all search results" card 304 is illustrated in FIG. 3b. The "all search results" card 304 includes a GUI rendered by an "all search results" module circuitry. This "all search results" GUI includes information regarding the selected entity. As depicted, information of the "all search results" GUI can be displayed through sub-GUIs associated with different categories, and module circuitry associated with the different categories. Each sub-GUI can be rendered by one or more related module circuitry. The "all search results" module circuitry can include configuration information, such as presentation configuration information for the module circuitry and sub-modules within the module circuitry. For example, in the FIG. 3b, the images sub-GUI is presented as a scrollable miniature tray with respective miniature cards displayed side-by-side, each card including an image of the entity associated with the tray 201a for Tom Cruze the actor. The "webpage results" sub-module is presented as a scrollable miniature tray with a listing of webpage based search results. These search results may be clickable to navigate to a corresponding webpage or another card associated with the entity tray. In FIG. 3b, depicted is a user's finger 306 gesturing over the webpage search results provided by the webpage results sub-module circuitry. Upon such a gesture, sections 208a and 206b have been hidden to allow more screen space to display the webpage search results.

The "all search results" module can also include configuration information relevant to which sub-modules to include with the "all search results" module. For example, in FIG. 3b, at least sub-modules for webpage search results and image search results have been selected to be included with the "all search results" module for Tom Cruze the actor. As mentioned, the selection of sub-modules per module may be global across all entities, particular per entity type, particular per entity, or any combination thereof. For example, in the "all search results" module, the "images" module may be included across people and thing entities but not places entities. Whereas, for example, "webpage results" module (as shown displayed in FIG. 3b as the sub-GUI 310) may be universally selected across all types of entities for the "all search results" module. A presentation of the "Romance" module (not depicted in FIG. 3b) may also be included just for the instance of the "all search results" module for Tom Cruze or any other person with multiple known intimate relationships and/or ex-spouses. It should be noted for the "all search results" module circuitry as well as other module circuitry with GUIs depicted herein, that associated sub-GUIs may be hidden from the illustrated views, but may become viewable upon scrolling through respective sections.

Figure 4B:
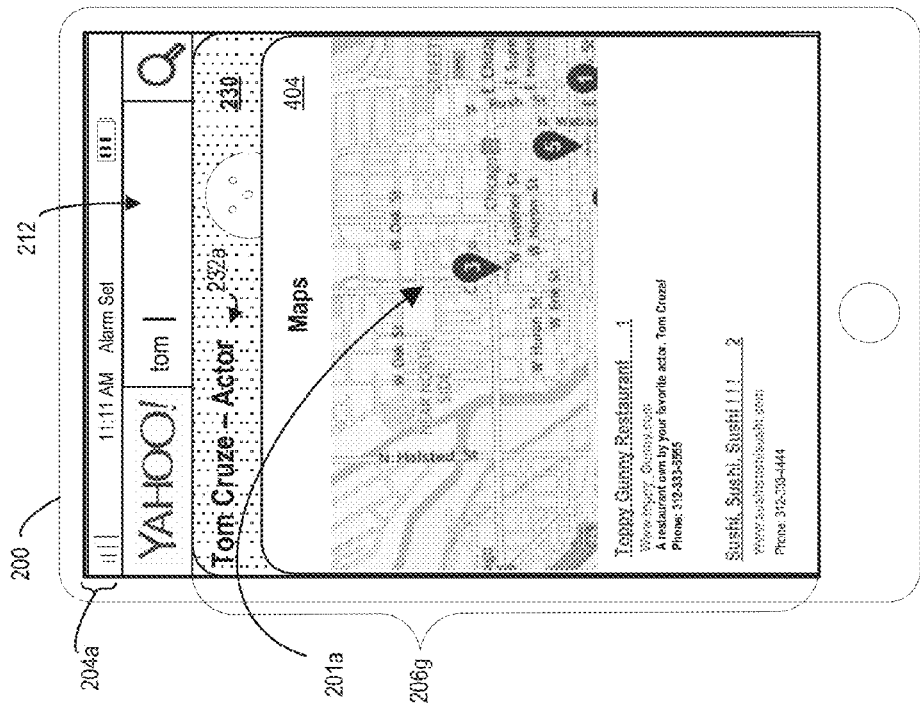
FIG. 4b illustrates the example expanded displayed entity search result object of FIG. 2b overlapped by an example map based search results section rendered by respective circuitry of the modular search object framework.
Figure 4A:
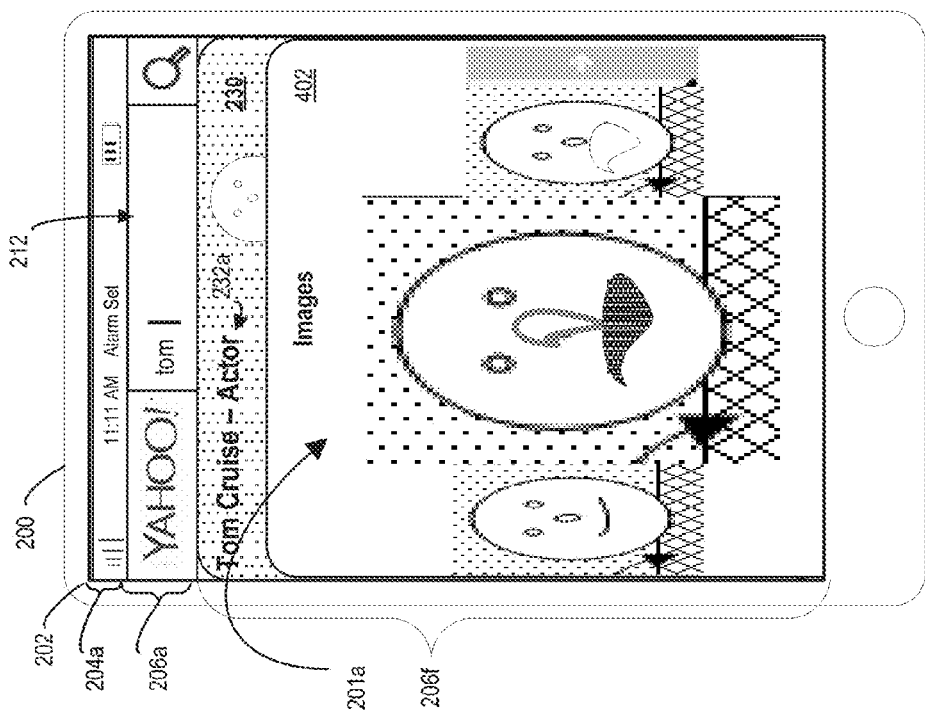
FIG. 4a illustrates the example expanded displayed entity search result object of FIG. 2b overlapped by an example image based search results section rendered by respective circuitry of the modular search object framework.

In FIG. 3b, the selected entity is still Tom Cruze, and a user may select a link, such as image link 312 or text link 314, or a sub-link, such as sub-link 316. Selecting a link, such as image link 312, may cause the client-side application to navigate to a webpage associated with a website hosting the corresponding image. Alternatively, it may cause the client-side application to navigate to a card within the tray of the entity, such as a card 402 for an image slideshow module (as depicted in FIG. 4a). Selecting a text link, such as text link 314, may cause the client-side application to navigate to a webpage corresponding with that link. Selecting a sub-link, such as sub-link 316 labeled "map", may cause the client-side application to navigate to a card, such as map card 404 within the tray of the entity (as depicted in FIG. 4*b*). Alternatively, selecting a sub-link, such as sub-link 316 labeled "map", may cause the client-side application to navigate to another webpage associated with the link, such as a webpage on the same website associated with the link having a map associated with the entity (e.g., see FIG. 4*b*). The information within GUIs of the framework may be images and/or text and may include hyperlinks to other cards within the entity tray, other entities, or may initiate related searches.

The information that appears in the "all search results" GUI may be scraped information, information from a content database, an ad database, or a search engine database, or any combination thereof, information selected by a party that is responsible for editing the information, information selected by machine learning, or any combination thereof. The search results displayed by the "all search results" GUI may be determined by various search engine algorithms. The search results may include most sought out information for the selected entity per category associated with the presented sub-GUIs. The most sought out categorical information and detailed information pertaining to each category for the entity may be gathered from online search logs and other logs pertaining to web browsing and searches. The categorical information and the search results may be updated in various intervals. The length of time between updates to each search result sub-GUI may be based on an amount that sub-GUI is requested for the selected entity.

To navigate back from card 402 in FIG. 4*a* or card 404 in FIG. 4*b*, a user may make a certain gesture towards the section 206*f* or 206*g*, respectively. In one example, a user may swipe downward starting at the top of the card to move that card downward, showing the sections of the tray 201*a* that have been overlapped by the card. For example, using a gesture to move down the card 402, may cause the presentation illustrated in FIG. 2*b*, FIG. 3*a*, or any other previously displayed card for that entity, such as the last card displayed for that entity prior to the card being moved downward. In other words, this functionality may act similar to a back button. To navigate to a new entity, the user may select a link to another entity or enter a new query in the search box 212 along with other actions. For example, upon entering text in the search box 212, the framework may cause the client device 200 to display search suggestions and/or search results similar to those depicted in section 206 of FIG. 2*a* except the suggestions and/or results pertain to the newly entered text. Then a user may select another entity from the listing.

Figure 9:
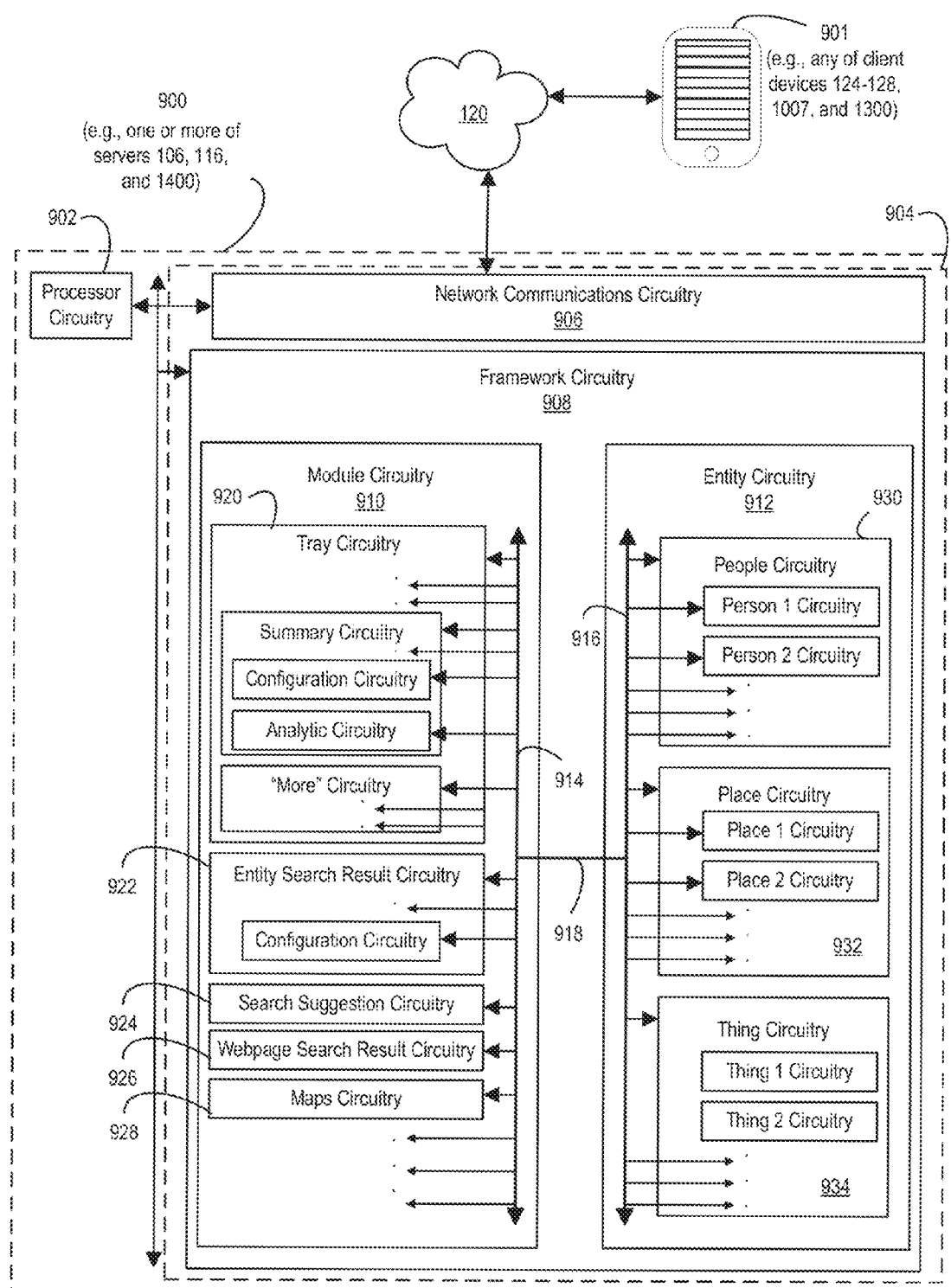
FIG. 9 illustrates a block diagram of example circuitry of a server of an example system that can provide aspects of the module search object framework, such as a modular search framework server 116 illustrated in FIG. 1.

FIG. 9 illustrates a block diagram of example circuitry of a server of an example system that can provide aspects of the module search object framework, such as the modular search framework server 116 illustrated in FIG. 1. FIG. 9 also shows a client device 901 (such as any of the client devices 124-128 of FIG. 1, or device 1007 of FIG. 10 and device 1300 of FIG. 13) communicatively coupled to a server 900, over the network 120. The server 900 may include one or more servers, such as the modular search framework server 116 and/or the search engine server 106.

The server 900 includes processor circuitry 902 (such as central processing unit 1402 of FIG. 14) and a system stored in a non-transitory medium 904 (such as memory 1410) executable by the processor circuitry. The system is configured to provide several aspects of the framework.

The system includes network communications circuitry 906 (such as circuitry included in the network interfaces 1430) and framework circuitry 908 (such as circuitry included in the modular search object framework 1426). The network communications circuitry 906 and the framework circuitry are communicatively coupled by circuitry. In this disclosure, circuitry may include circuits connected wirelessly as well as circuits connected by hardware, such as wires. The network communications circuitry 906 may be configured to communicatively couple the system to the client device 901 over the network 120. This for example allows an entity section provided by the server 900 to be displayed by a client-side application installed on the client device 901.

The framework circuitry 908 includes module circuitry 910 (such as module circuitry 1427*a*), entity circuitry 912 (such as entity circuitry 1427*b*), inter-module interface circuitry 914, inter-entity interface circuitry 916, and inter-framework interface circuitry 918. The inter-module interface circuitry 914 may be configured to communicatively couple any module circuitry of the module circuitry 910. For example, this circuitry 914 may at least communicatively couple entity GUI module circuitry, such as tray module circuitry 920, to one or more other circuitry of the module circuitry 910.

The inter-framework interface circuitry 918 may be configured to communicatively couple at least one entity circuitry of the entity circuitry 912 to any one of the plurality of module circuitry in the module circuitry 910, such as coupling any one of the entity circuitry to the tray module circuitry 920. For the example entity sections illustrated in FIGS. 2*a*-8*b*, the tray module circuitry may be configured to interact with the at least one entity circuitry to output an interactive entity section to a page view for a corresponding entity. Also, in such an example, the interactive section may include a plurality of moveable visual objects with information relevant to the corresponding entity. Also, in such an example, the plurality of moveable visual objects may be moveable within the interactive entity section. These functions can be implemented via the interoperating of the sub-circuitry of the module circuitry 910 and the entity circuitry 912.

Also, these moveable objects and associated functionality can be provided by any type of module circuitry and entity circuitry interoperating by the coupling provided by the inter-framework interface circuitry 918. In an example, the moveable visual objects may be cards. Also, the cards may have rounded corners as depicted in FIG. 2*a*-8*b*. A card of such cards may include a miniature tray of miniature cards within the card, and the miniature cards may include information relevant to the entity, as depicted in FIG. 3*a*. Also, the moveable object may include links for navigation between entities, and such objects may be overlapping, such as where a first overlapping object is moveable to view at least part of a second object beneath the first object. Also, the moveable visual objects may be adjacent to or abutting one other object of the moveable objects. These functions can be implemented via the interoperating of the sub-circuitry of the module circuitry 910 and the entity circuitry 912.

Also, beneficial functionality, such as movement by an object of the plurality of moveable objects being seamless without unintentional visual artifacts, can be due to close coupling of the circuitry of the framework circuitry 908. Additionally, close coupling between client-side circuitry of the framework circuitry installed on the client device 901 and native operating system circuitry of the client device, circuitry of a client-side application installed on the client device, or both, can improve such beneficial functionality as well. Code can be communicated from the server 900 to the client device 901, which provides addition to and configuration of the client-side circuitry of the framework circuitry for the client device. For example, circuitry within client device 1007 of FIG. 10 may be added to or altered according to such code communicated from the server 900. The code may include objects representative of part of the framework circuitry 908.

The inter-entity interface circuitry 916 may be configured to communicatively couple at least one of the plurality of entity circuitry to one or more other of the plurality of entity circuitry, of the entity circuitry 912. The inter-entity interface circuitry 916 is communicatively coupled to the inter-module interface circuitry 914 by the inter-framework interface circuitry 918. These interconnections can provide a basis for the linking between entities as illustrated in FIGS. 2a-8b and corresponding text, and associating certain module GUIs with certain entities.

The module circuitry 910 can include at least one module circuitry, such as the tray module circuitry 920. Other examples of module circuitry within the module circuitry 910 can include entity search result circuitry, search suggestion circuitry, non-entity search result circuitry (such as webpage search result circuitry), maps circuitry, and much more. Such circuitry can provide the various structures and operations illustrated in FIGS. 2a-8b and FIGS. 10-12. As illustrated by FIG. 9, a hierarchy of module circuitry within the circuitry 910 can be extensive. For example, as depicted, module circuitry, such as the tray module circuitry 920, can include sub-module circuitry, and that sub-module circuitry can each have sub-module circuitry of its own. For example, a majority of the module circuitry of the circuitry 910 (whether or not a sub-module circuitry) can each at least include sub-module circuitry configuring that circuitry and configuring one or more GUIs provided by that circuitry. The example organization of the circuitry of the module circuitry 910 coincides with the arrangement of GUIs and sub-GUIs illustrated in FIGS. 2a-8b. However, other arrangements could coincide with the depicted GUIs as well.

The tray circuitry 920 may include the summary circuitry, the tray configuration circuitry that may include the tray GUI configuration circuitry, and the "more" circuitry associated with the "more" GUI depicted in FIG. 3a, for example. Also, as illustrated in FIG. 9, the tray circuitry 920 includes other sub-circuitry for other functions imaginable by the framework related to a tray object. In FIG. 9, the summary circuitry, such as the respective circuitry providing the summary GUI in FIG. 2b, includes configuration circuitry such as circuitry for the configuration of the summary GUI, and analytic circuitry. The analytic circuitry may provide for at least part of the information possibly intended to be viewed by a user. Several GUIs of the framework may be associated with the analytic circuitry of the summary circuitry or other analytic circuitry of module circuitry 910. Such GUIs are likely to incorporate predictively desired information to audience members of the framework.

The entity search result circuitry 922 may provide various functionalities and structures associated with retrieving and displaying entity search results, such as the entity search results depicted in FIGS. 2a, 5a, 5b, 8a, and 8b. The search suggestion circuitry may provide various functionalities and structures associated with retrieving and displaying search suggestions, such as the search suggestions depicted in FIGS. 2a, 5a, 8a, and 8b. The webpage search result circuitry 926 may provide various functionalities and structures associated with retrieving and displaying webpage search results, such as the webpage search results depicted in FIGS. 3b, 4b, and 8b. For the purposes of this disclosure, webpage search results are an example of non-entity search results. Other example, non-entity search results are image search results associating images ambiguously with a search query. Entity search results are results that include informational objects for a specific entity, such as a particular person, place, or thing. With places and things, there are sub-entities. Entities will be explained in more detail at another part of this disclosure. The maps circuitry 928 may provide various functionalities and structures associated with retrieving and displaying maps based search results, such as the map search results depicted in FIG. 4b. The maps circuitry 928 may include or be associated with navigation circuitry of the module circuitry 910 (such as circuitry including circuitry for discovering routes and device geographic positioning). As mentioned, each of the module circuitry may include sub-module circuitry, such as corresponding user interface circuitry, configuration circuitry, analytic circuitry, data processing circuitry, data storage circuitry, data retrieval circuitry, navigation circuitry, or any combination thereof. The examples of module circuitry described herein and shown in FIG. 9 are merely illustrative of the expansiveness of the framework.

The entity circuitry 912 include various types of entity circuitry, including people circuitry 930, place circuitry 932, and thing circuitry 934. The people circuitry 930 includes circuitry for each particular person that can be identified as an entity by the framework. A particular person can be an actual living person or a person who has passed away. Well-known people, who are often searched online, such as celebrities, may be automatically inputted into the framework and hence circuits are generated for those people automatically. Less known people, such as an ordinary Joe starting a small business, may submit an application for circuitry to be generated for themselves or a business and/or product they wish to market through the framework. A particular person can also be a character in a fictional work. For fictional characters, there may be a plurality of entities for a known character. For example, the character Supermom may have entity circuitry for each entered iteration of the Supermom character inputted into the framework, such as a plurality of Supermoms from the different Supermom movies and television series, and a plurality of Supermoms from the different versions of the Supermom comic books. A person entity becomes identifiable when a corresponding entity has been submitted and accepted by the framework. At that point, circuitry can be generated for that person entity. The front end for the modular search framework server 116 and/or the account server 102 can facilitate entry of entities, such as people entities.

The place circuitry 932 includes circuitry for each particular location that can be identified as an entity by the framework. A particular location can be an address, a global positioning point, an actual location not having an address, or combination thereof. Actual locations not having an address can be submitted through an application process, such as an obscure park. Locations that are commonly searched without an address can be automatically inputted into the system as circuits, such as a national park. In other words, well-known places, which are often searched online, such as landmarks, government administrated parks, cities, countries, and even well-known bodies of water, may be automatically inputted into the framework and hence circuits are generated for those places automatically. Less known places, such as an ordinary parking lot without an address, may be submitted via an application for circuitry to be generated for that place. Businesses and products may be marketed through a place entity, for example. Places can be any geographic entity, whether that entity is fictional, non-fictional, still in existence, historical, or some combination thereof. For fictional places, there may be a plurality of entities for a known fictional place. For example, each iteration of Atlantis used in fictional works may have its own entity circuit. A place entity becomes identifiable when a corresponding entity has been submitted and accepted by the framework. At that point, circuitry can be generated for that place entity. A front end for the modular search framework server 116 and/or the account server 102 can facilitate entry of entities, such as place entities.

The thing circuitry 934 includes circuitry for each particular thing that can be identified as an entity by the framework. A particular organization, product, service, named organism (such as a pet or famous circus animal), can be a thing entity. Thing entities can overlap with places entities and fictional character entities; for example, a geographic location like the dark side of the moon may be a thing as well. Also, for example, the Wizard of Oy may be a thing entity (such as a movie entity), and a character entity, such as the Wizard of Oy the character in the original movie production. Also, there may be several iterations of a thing. To continue with the Wizard of Oy theme, there may be several well-known productions of this movie in a live theatre format. Well-known things, which are often searched online, such as movies, mass manufactured products, and large companies, may be automatically inputted into the framework and hence circuits are generated for those things automatically. Less known things, such as a new product developed by an ordinary Joe, may be submitted via an application for circuitry to be generated for that thing. Services and products may be marketed through a thing entity, for example. Things can be almost any unambiguous thing that can be claimed. Things can be fictional, non-fictional, still in existence, historical, or some combination thereof. A thing entity becomes identifiable when a corresponding entity has been submitted and accepted by the framework. At that point, circuitry can be generated for that thing entity. A front end for the modular search framework server 116 and/or the account server 102 can facilitate entry of entities, such as thing entities.

Each particular person, place, or thing circuitry of the entity circuitry 912 can include and provide respective data models for gathering, maintaining, and entering information on that corresponding entity. These data models can also act as an interface for data requested by various operations provided by the module circuitry 910. Each particular entity circuitry may also include logic for facilitating operations between module circuitry of the circuitry 910 and databases storing information on entities. In other words, such entity circuitry may act a middleware between functions and data of the framework. Given this middleware functionality, module circuitry, such as the summary module circuitry, does not need to include sub-circuitry for every entity in the system. When module circuitry is called for an entity, that module circuitry can combine with the entity circuitry via communications instead of actual circuitry per entity hardwired into each module.

Regarding the example entity screen in FIG. 2b, various functions are being called which are provided by the module circuitry 910, such as functions of the summary module circuitry. For a function of the summary module circuitry to retrieve information on Tom Cruze the actor, the function communicates with the particular entity circuitry for Tom Cruze the actor. This particular entity circuitry may have the information on Tom Cruze cached or permanently stored within its circuitry or may request the information from a database, such as a database specifically for the modular search framework server 116 (not depicted in FIG. 1) and/or the content database 114 or ad database 110.

Figure 10:
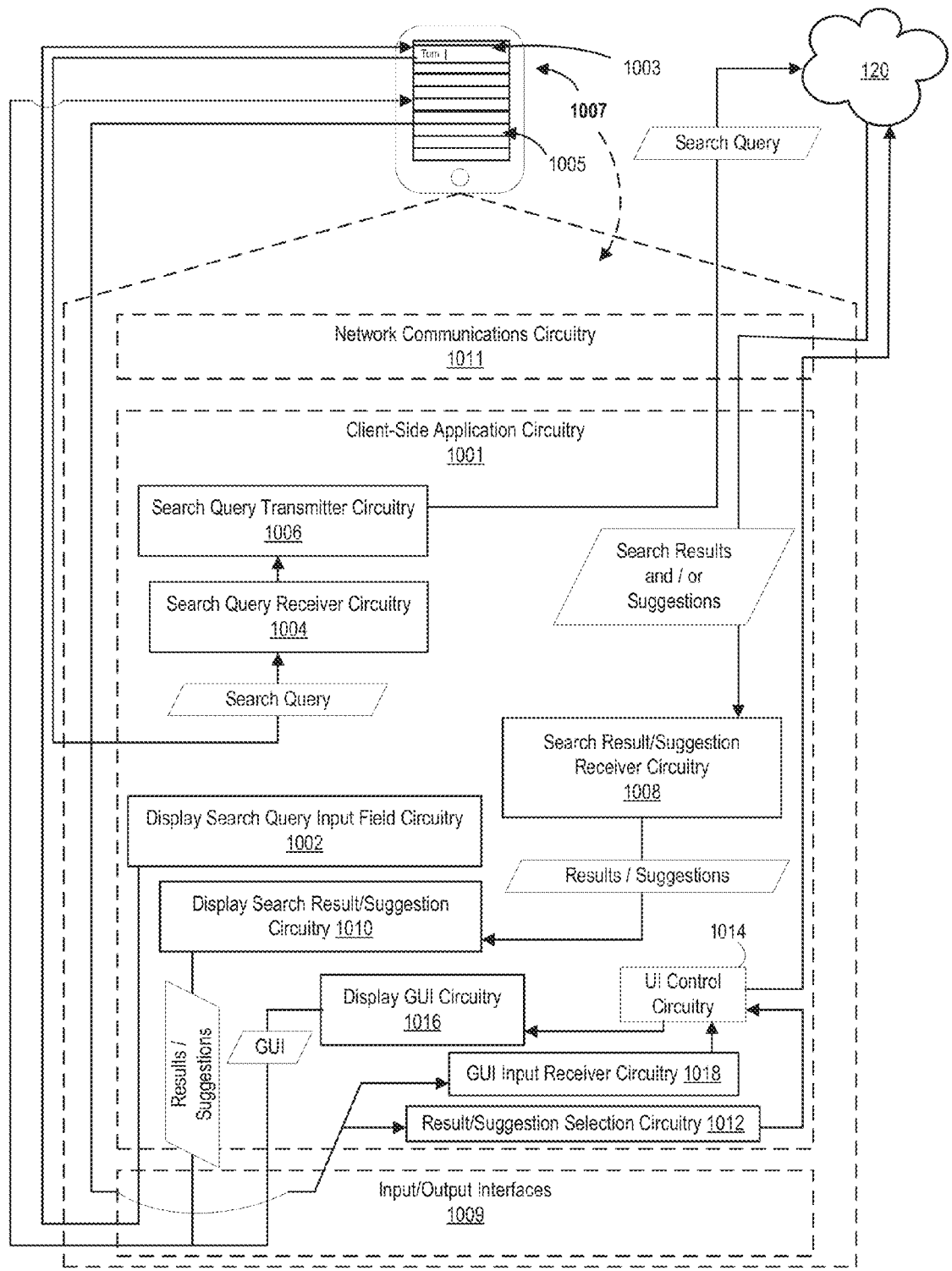
FIG. 10 illustrates a block diagram of example circuitry of a client device of an example system that can provide aspects of the module search object framework, such as any client device of the system illustrated in FIG. 1.
Figure 13:
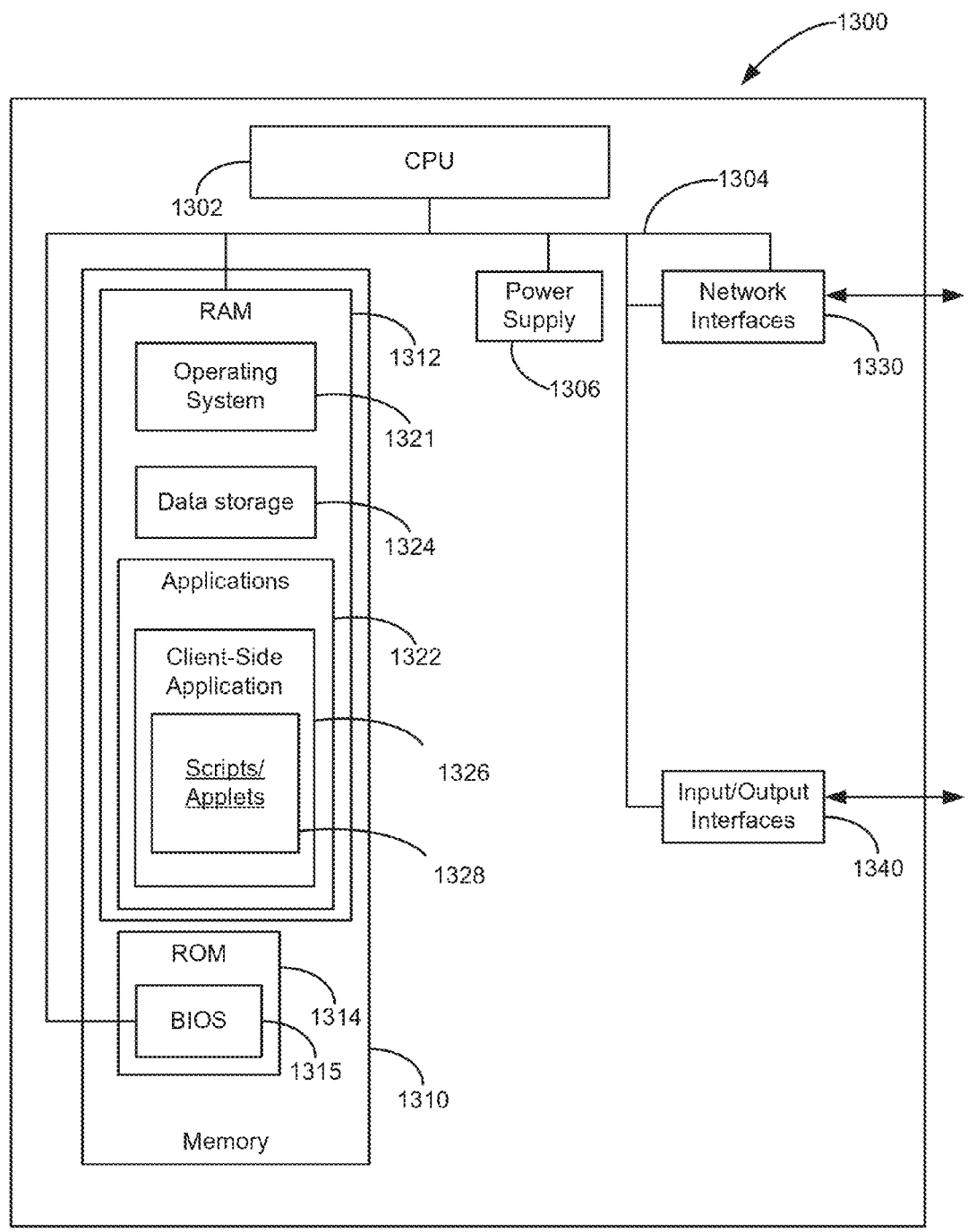
FIGS. 13 and 14 are block diagrams of example electronic devices that can implement aspects of and are related to the example system that can provide a modular search object framework. For example.

FIG. 10 illustrates a block diagram of example circuitry of a client device of an example system that can provide aspects of the module search object framework, such as any client device of the system illustrated in FIGS. 1 and 13. For example, FIG. 10 illustrates a block diagram of example circuitry of a client device 1007 that can provide entity search results, non-entity search results, and search suggestions within a section of a page view at least partially provided by a client-side aspect of the framework. The circuitry within the client device 1007 can be part of and/or associated with a non-transitory medium executable by a processor of the client device. The circuitry can include input/output interfaces 1009 (such as the input/output interfaces 1340 of FIG. 13). The circuitry can also include client-side application circuitry 1001 (such as circuitry of the client-side application 1326 of FIG. 13). The circuitry can also include network communications circuitry 1011 (such as network interfaces 1330 of FIG. 13).

The client-side application circuitry 1001 can include first circuitry 1004 configured to receive a search query from a search query input field 1003 of the page view. Also, the client-side application can include circuitry 1002 configured to display the search query input field. The search query can be inputted by a user via the search query input field 1003 and a user input device (such as a user input device of the input/output interfaces 1009). For example, input and output may be received via a touchscreen 1005. The search query can include text, an image, a voice command, a gesture (such as a gesture from a user's eye, head, torso, arm, hand, finger or any combination thereof), or any combination thereof. The receiving of the search query can occur at a placeholder within a non-transient computer readable medium, such as a reserved memory slot for that placeholder in a memory device of the client device 1007. The search query can be manifested in the computer readable medium by a physical state change at the placeholder within the medium.

The client-side application circuitry 1001 can also include second circuitry 1006 configured to communicate the search query to a search server (such as search engine server 106 of FIG. 1, a sponsored search server, and/or the modular search framework server 116) over a network (such as the network 120). The communicating of the search query can occur by a communications interface embedded or connected to the client device, such as a communications interface of the network communications circuitry 1011. The communications interface can transform the changed physical state of the medium, which represents the search query, to an electromagnetic signal of any type for communications across a computer network link. The communications interface can be communicatively coupled to the non-transient computer readable medium and the search server. The search server and the client device 1007 can be one or more computers connected over the network 120. The aforementioned communicative couplings and other such couplings described herein can be implemented by various types of wired and wireless connections. The communications across the couplings can be via any form of electromagnetic signal, such as an electrical signal, an optical signal, or any combination thereof. Also, in an example, the search server can be the search engine server 106, a sponsored search server, the modular search framework server 116, or any combination thereof.

The search query can be communicated with user information, wherein the user information includes demographic information associated with the user, psychographic information associated with the user, a real-time geographic location of the user, or any combination thereof. The search query can be communicated over a network that is part of a cloud computing environment. The search server can also be part of the cloud computing environment. The search server can be communicatively coupled to a content server, an ad server, an analytics server, an account server, a sponsored search server, or any combination thereof (such any one or more of the servers of FIG. 1). Any of these parts may be part of the cloud computing environment.

The client-side application circuitry 1001 can also include third circuitry 1008 configured to receive entity and non-entity search results, such as entity and non-entity sponsored search results, from the search server according to the search query. This circuitry may also receive search suggestions from the server. Additionally or alternatively, search suggestions may be generated by a client-side circuit, such as by circuitry associated with the scripts and/or applets 1328. The receiving of the search result can occur by a communications interface embedded or connected to the client device, such as a communications interface of the network communications circuitry 1011. The communications interface can transform an electromagnetic signal that represents the sponsored search into changed physical state of the non-transitory computer readable medium that represents the search result.

A search result can be determined at the search server according to the search query. This determination can be done by a non-entity or entity non-sponsored search results determiner circuitry and/or a non-entity or entity sponsored search results determiner circuitry hosted by the search server. A search result can also be determined according to the user information. The search result can also be determined from data from the content server, the ad server, the analytics server, the account server, the sponsored search server, or any combination thereof (such as any one or more of the servers of FIG. 1). The search result can include instructions associated with a sub-GUI that can extend out from, overlap, or both, a respective set of search results, such as illustrated in FIGS. 2a, 2b, 8a, and 8b. The instructions associated with the sub-GUI are hidden from view of the user, such as in the form of web browser readable and/or executable code.

The client-side application circuitry 1001 can also include fourth circuitry 1010 configured to display the entity and/or non-entity search results on the page view (such as the search results 502a-502f and 504a-504c in FIG. 5a). Where the search result is a sponsored search result, the sponsored search result can be displayed within a section of the page view dedicated to sponsored search results (such as the ad sections 806b and 806c in FIGS. 8a and 8b). In examples where the result is a sponsored result, the sponsored search result can also be displayed within a search results list that includes sponsored search results and non-sponsored search results (such as search result 502e in FIG. 5a). In such examples, the sponsored search result can be displayed first in a list of displayed search results, whether those results are sponsored or not (not depicted). Also, the sponsored search result can abut a non-sponsored search result.

The displaying of the search result on a page view can occur on a display device of the touchscreen 1005 already displaying the page view, wherein the display device is either embedded or connected to the client device 1007. For examples of the results of this functionality, see results 502a-502f, 504a-504c, and 254a-254d of FIGS. 5a and 5b, respectively. A graphics card or any other type of graphics processing device can transform the part of the computer readable medium representing the search result into an electromagnetic signal representing the sponsored search that can be communicated to the display device. At this point, the signal is rendered into a visual presentation by the display device. Any one of these technical functions can be implanted via an output device (such as an output device of the input/output interfaces 1009) of the touchscreen 1005.

The client-side application circuitry 1001 can also include fifth circuitry 1012 configured to receive a selection of a part of the search result. When a selection is for an entity search result, such a selection can cause the displaying of an entity GUI and sub-GUIs. The receiving of the selection can occur at a placeholder within a non-transient computer readable medium, such as a reserved memory for that placeholder in a memory device of the client device 1007. The selection can be manifested in the computer readable medium by a physical state change at the placeholder within the medium. The selection can be inputted by a user via an icon selection input field and a user input device (such as a user input device of the input/output interfaces 1009). The selection can occur by a user clicking on, moving over, or touching a search result. The selection may occur by a tactile input, a voice command, a gesture (such as a gesture from a user's eye, head, torso, arm, hand, finger or any combination thereof), or any combination thereof.

The client-side application circuitry 1001 can also include sixth circuitry 1016 configured to display a GUI and/or sub-GUI associated with the search result (or a search suggestion). The displaying of the sub-GUI can occur in the same page view. The user interface can be proximate to the selected search result icon. The user interface can be within the same section of the search result. The user interface can abut the search result. The user interface can be immediately below the search result. The user interface can be immediately above the search result. The user interface can be immediately to a side of the search result. The user interface can be immediately kitty-corner of the search result. The user interface can be within a list of search results so that the user interface occurs below or above the search result and above or below, respectively, a search result initially below or above the search result. The search result initially below or above the search result could have been immediately below or above the search result. The displaying of the GUI or sub-GUI may cause the search result, which is immediately above or below the other search result, to move up or down according to the positioning of the GUI or the sub-GUI.

The GUI or sub-GUI can present audio content, video content, textual content, graphical content, tactile content, any other type of human perceivable content, a web form, a video game, a link to a second page view, or any combination thereof. The GUI or sub-GUI can be displayed on or over the entire page view. The GUI or sub-GUI can be displayed on or over a majority of the page view. The sub-GUI can be displayed on or over a majority or the entirety of a page section containing the search result. In examples, where the GUI or the sub-GUI is displayed over a part of the page view, at least part of the GUI or sub-GUI can at least be partially transparent. In other examples, the one or more parts besides the user interface can be suppressed visually when the GUI or sub-GUI is displayed. The visual suppression can include blurring, reduction in size, reduction in brightness, reduction in sharpness, pixelization, filtering out one or more colors, or any combination thereof.

Examples of GUIs and sub-GUIs and their transitions are shown in FIGS. 2a-8b. A graphics card or any other type of graphics processing device can transform the part of the computer readable medium representing the GUI or sub-GUI into an electromagnetic signal representing the GUI or sub-GUI that can be communicated to the display device. At this point, the signal is rendered into a visual presentation by the display device. Any one of these technical functions can be implanted via an output device (such as an output device of the input/output interfaces 1009).

The client-side application circuitry 1001 can also include seventh circuitry 1018 configured to receive a user input from a user input field of the GUI or sub-GUI. The receiving of the user input from the user input field of the GUI or sub-GUI can occur at a placeholder within a non-transient computer readable medium. Also, the receiving of the user input or any other receiving of user input described herein can occur via various known ways of receiving user input, such as the ways described herein. For example, the user input for the GUI or sub-GUI can be received and processed via a user input device (such as a user input device of the input/output interfaces 1009). The user input can include text, an image, a voice command, a gesture (such as a gesture from a user's eye, head, torso, arm, hand, finger or any combination thereof), or any combination thereof.

The user input field can include a text box with one or more lines for entering text, a check box, radio button, a file select control for uploading a file, a reset button, a submit button, a drop-down list, a scrollable list, or any combination thereof. The user input field can also include a selectable image, an animated image, a fixed image, or any combination thereof. The user input field can be presented according to the search query, demographic information associated with the user, psychographic information associated with the user, a real-time geographic location of the user, or any combination thereof.

The client-side application circuitry 1001 can also include eighth circuitry 1014 configured to initiate an action according to the received user input from the user input field of the GUI or sub-GUI. The action can be manifested by one or more computer parts described herein, network parts described herein, any other known computer hardware, any other known computer software, and any combination thereof. For example, an action that occurs usually on the client-side can be implemented by a part of the client device 1007. An action that occurs usually on the server-side can be implemented by a part of one of the servers described herein, such as the servers described with respect to FIG. 1.

The action can include displaying one or more GUIs or sub-GUIs, which can include or be associated with audio content, video content, textual content, graphical content, tactile content, any other type of human perceivable content, a web form, a user input field, a link to a another GUI or sub-GUI, such as one of another entity, a change to a state of a user input field (such as a location of the field, a size of the field, coloring of the field, brightness of the field, shape of the field, or another type of graphical makeup of the field, or any combination thereof), or any combination thereof. The action can include submission of the user input to a server. Such a submission can be used towards a transaction. The submission can be stored in a database. Also, the submission can be used to determine at least part of the displaying of the GUIs and sub-GUIs (in other words, the submission can be used as feedback).

Figure 11A:
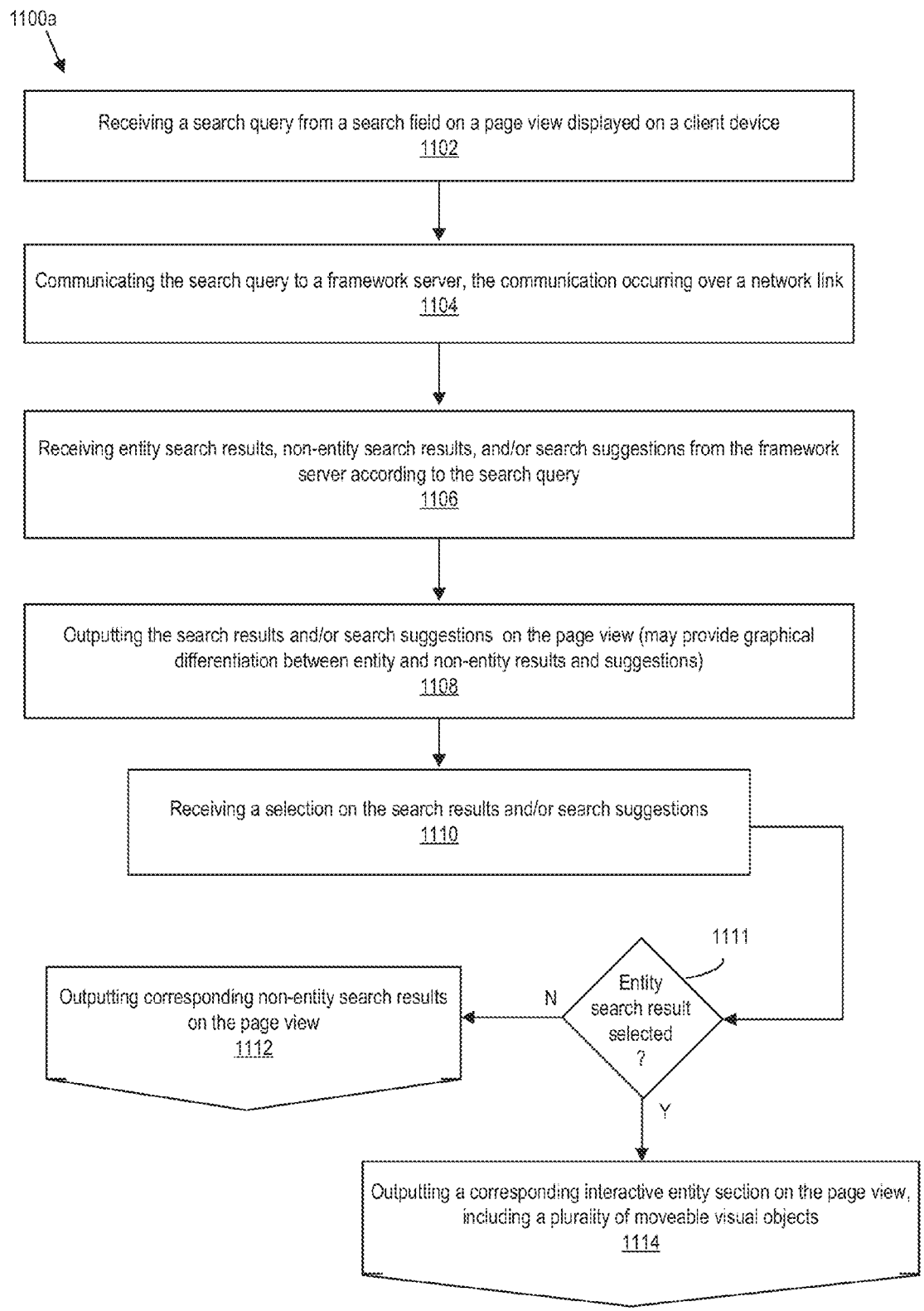
FIG. 11a illustrates example operations of example circuitry of an example system that can provide aspects of the module search object framework. In an example, the operations can be performed by circuitry of a client device such as any client device of the system illustrated in FIG. 1.

FIG. 11a illustrates example operations 1100a of example circuitry of an example system that can provide aspects of the module search object framework. In an example, the operations can be performed by circuitry of a client device such as any client device of the system illustrated in FIG. 1. The operations 1100a can include receiving a search query from a search field on a page view displayed on a client device (such as any client device depicted in FIGS. 1, 10, and 13), at 1102. This receiving at 1102 can occur at user interface circuitry (such as user interface circuitry of the input/output interfaces 1009 in FIG. 10 or a user input interface of the input/output interfaces 1340 in FIG. 13). The operations 1100a can also include communicating the search query to a framework server (such as the modular search framework server 116), at 1104. The communication at 1104 can occur over a network link (such as over a network link in the network 120). The communication at 1104 can be initiated by network communications circuitry (such as the network communications circuitry 1011 or the network interfaces 1330) communicatively coupled to the user interface circuitry. The operations 1100a can also include receiving an entity search result, a non-entity search result, a search suggestion, or any combination thereof from the framework server according to the search query, at 1106. This receiving at 1106 can occur at the network communications circuitry. The operations 1100a can also include outputting the entity search result, the non-entity search result, the search suggestion, or any combination thereof on the page view, at 1108.

In an example, the outputting at 1108 may include providing graphical differentiation between entity and non-entity search results. Also, the outputting at 1108 may include providing graphical differentiation between entity search results and search suggestions. The differentiation may also occur between any kind of search results and search suggestions. The differentiation may also occur by distinctions in audio output or some other form of perceivable output. Differentiation of entity search results, non-entity search results, and search suggestions can occur by a particular ordering of these items when displayed in a list. For example, entity search results can occur in the list first, followed by non-entity search results, and then search suggestions. The differentiation can also occur by displaying a background for one type of item that is different for a background of the other types of list items. The difference in the backgrounds can be coloring. Also, for example, backgrounds of one of these types of items can be derived from a photograph or an illustration related to a corresponding entity and can appear to have multiple colors, whereas backgrounds for the other types of listed items can appear to be one color or one color range. In other words, the differentiation can occur by graphical parameters for one type of item that are different from the graphical parameters for the other types of list items.

Also, the operations 1100a can include receiving a selection of an entity search result, a non-entity search result, a search suggestion, or any combination thereof, at 1110. Upon receiving the selection at 1110, circuitry of the client device and/or the server can determine whether to the selection was on an entity search result, at 1111. Where an entity search result is selected, the operations 1100a can continue with outputting an interactive entity section of the page view by the user interface circuitry. This section can then be displayed to the page view. The interactive section can include a plurality of moveable visual objects moveable within the interactive entity section. Where a non-entity search result is selected or a search suggestion is selected, the operations 1100b continue with outputting corresponding non-entity search results on the page view, at 1112. In an example, the outputting of results after a user selects a search suggestions can also lead to entity search results.

Figure 11B:
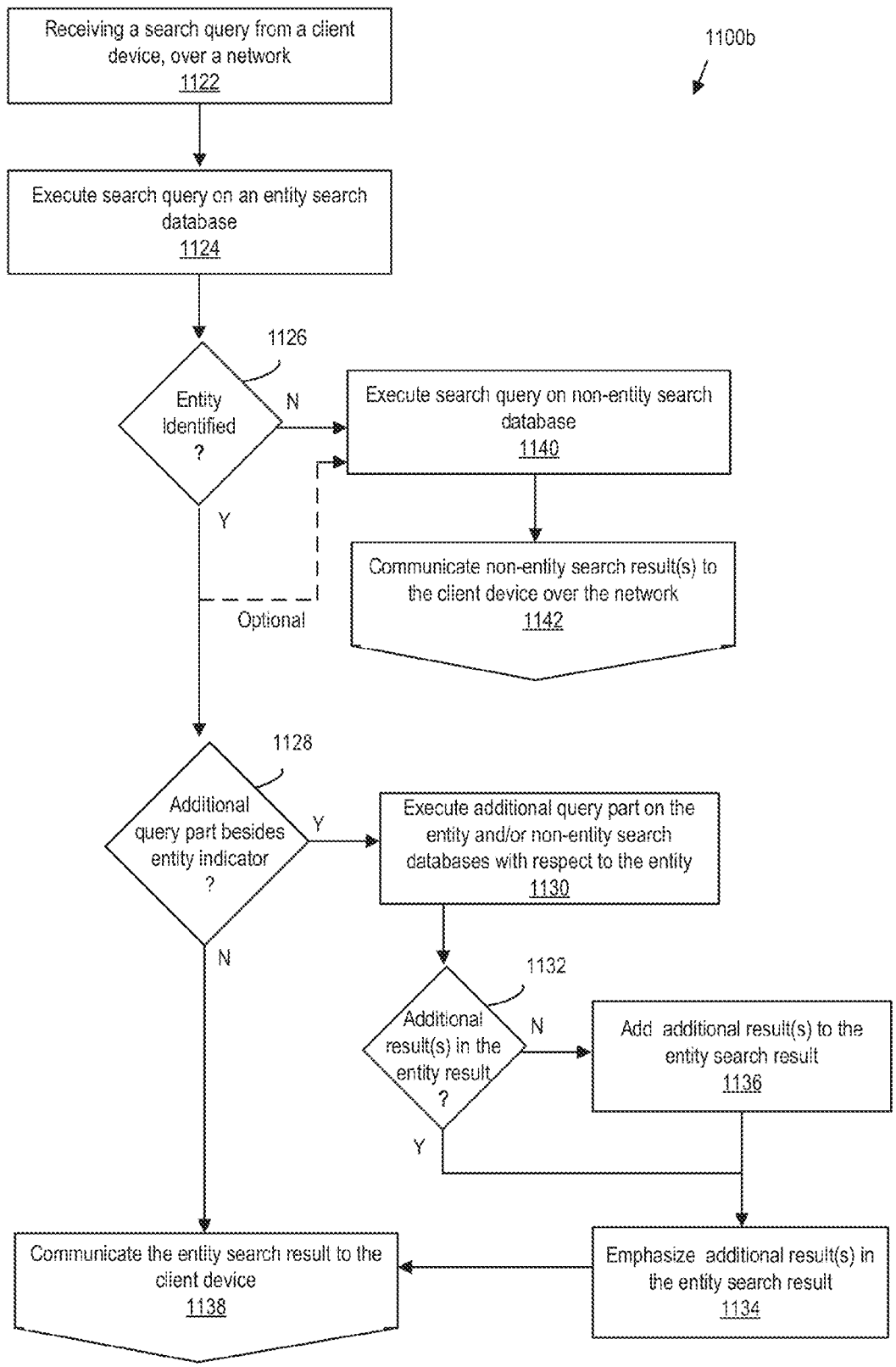
FIG. 11b illustrates example operations of example circuitry of an example system that can provide aspects of the module search object framework. In an example, the operations can be performed by circuitry of a server, such as the modular search framework server 116 illustrated in FIG. 1.

FIG. 11b illustrates example operations 1100b of example circuitry of an example system that can provide aspects of the module search object framework. In an example, the operations can be performed by circuitry of a server, such as the modular search framework server 116 illustrated in FIG. 1. The operations 1100b can include receiving a search query from a client device (such as any client device of FIGS. 1, 10, and 13), at 1122. The receiving of the search query at 1122 can occur at network communications circuitry (such as the network communication circuitry in the network interfaces 1430 illustrated in FIG. 14). Also, the communicated query received at 1122 can occur over a network, such as the network 120 in FIG. 1.

The operations 1100b can also include executing the search query on an entity search database, at 1124. The execution at 1124 can occur by search engine circuitry (such as by circuitry included in the framework circuitry 908 of FIG. 9 and/or circuitry included in the search engine server 106 and/or the modular search framework server 116). The entity search database can be communicatively coupled to such circuitry and can include at least part of the ad database, the content database, the account database, the analytics database 119, a database closely coupled to the modular search framework server 116, or any combination thereof. The search engine circuitry can also be communicatively coupled to the network communications circuitry.

The operations 1100b can also include identifying an entity indicator in the search query, according to the execution of the search query on the entity search database, at 1126. This identification at 1126 can be done by the search engine circuitry, and can also be part of the execution of the query on the entity search database. Upon identification of the entity indicator, the search engine circuitry can identify the entity search result according to the entity indicator. The operations 1100b can also include identifying an additional query part besides the entity indicator in the search query, at 1128. The identification of the additional query part can be according to the execution of the search query on the entity search database. This identification at 1128 can be done by the search engine circuitry, and can also be part of the execution of the query on the entity search database.

Upon identifying the additional query part at 1128, the operations 1100b can also include executing the additional query part on the entity search database, a non-entity search database, or both, with respect to the entity search result, at 1130. The non-entity search can be communicatively coupled to the search engine circuitry and can include at least part of the ad database, the content database, the account database, the analytics database 119, a database closely coupled to the modular search framework server 116, or any combination thereof. In an example when an additional query part is identified at 1128, the search engine circuitry can also be configured to interpret the search query as a question. When the query is interpreted as a question, the one or more additional search results can be provided as one or more answers to the question. For example, in FIG. 6b, the query input at the query box 212 is "Katie Bolmes Favorite Color". This can be interpreted into a question, such as "What is Katie Bolmes' favorite color?" As depicted in FIG. 6b, an answer to the question has been presented along with the presentation of the entity search result.

The operations 1100b can also include identifying one or more additional search results in the entity search result, at 1132. The identification of the one or more additional search results in the entity search result can be according to the execution of the additional query part on the entity search database, the non-entity search database, or both. This identification at 1132 can be done by the search engine circuitry, and can also be part of the execution of the query on the entity search database, the non-entity search database, or both. The identifying of the one or more additional search results at 1132 may occur by the search engine circuitry predicting one or more search results a user submitting the search query most likely intended to receive by the submission. In such an example, the search engine circuitry may include or be communicatively coupled with analytic circuitry such as analytic circuitry of the analytics server 118, circuitry of the analytics database 119, circuitry of the modular search framework server 116 (such as analytic circuitry of the framework circuitry 908 or 1426), circuitry of the framework database, client-side analytic circuitry (such as circuitry of the scripts and/or applets 1328), or any combination thereof. In other words, the search engine circuitry can be further configured to determine whether the one or more additional search results exist in the entity search result, and then may act accordingly.

Upon identifying the one or more additional search results in the entity search result at 1132, the operations 1100b can also include emphasizing the one or more additional search results in the entity search result, at 1134. Otherwise, where the one or more additional search results are not identified in the entity search result at 1132, the operations 1100b can also include adding the one or more additional search results to the entity search result, at 1136, and then performing the emphasizing at 1134.

The emphasizing of the one or more additional search results in the entity search result can be by adding a visual representation of the one or more additional search results in a predetermined position in a first graphical user interface (GUI) to appear after a user selects the entity search result on the client device. The predetermined position can be a variable position relative to other viewable information in the first GUI. Alternatively, the predetermined position can be fixed. As illustrated in FIG. 6b, the predetermined position 604 can be above all entity-specific text of the first GUI besides a displayed title of the first GUI.

Alternatively or additionally, the emphasizing of the one or more additional search results in the entity search result can be by including a visual representation of the one or more additional search results in a most forefront part of a first GUI to appear after a user selects the entity search result on the client device. The most forefront part can be provided by making the most forefront part appear closer to the user viewing the first GUI than other parts. Also, the most forefront part can overlap at least one other part of the first GUI in addition to overlapping a background part, and may not be overlapped by any part of the first GUI. The most forefront part can also be sharper than at least a majority of other parts of the first GUI.

Furthermore, the emphasizing of the one or more additional search results in the entity search result can be made by a visual representation of the one or more additional search results contrasting with background elements of a first GUI greater than contrasting of at least a majority of other visual objects of the first GUI with the background elements. In such an example, the first GUI can be an initial GUI to appear after a user selects the entity search result on the client device.

The emphasizing of the one or more additional search results in the entity search result can also be made by enlarging a visual representation of the one or more additional search results relative to all other visual objects of a first GUI to appear after a user selects the entity search result on the client device. Also, the emphasizing of the one or more additional search results in the entity search result can be made by reducing sizes of at least a majority of visual objects in a first GUI to appear after a user selects the entity search result on the client device. The at least a majority of visual objects may exclude a visual representation of the one or more additional search results and a background object of the first GUI.

Also, the emphasizing of the one or more additional search results in the entity search result can be made by audio outputting of the one or more additional search results after a user selects the entity search result on the client device. In an example, the audio outputting can occur while a first GUI to appear after the user selects the entity search result on the client device is outputted.

The operations 1100b can also include communicating the entity search result to the client device over the network, at 1138. The communicating of the entity search result to the client device can be initiated by the network communications circuitry. Where there are no additional query parts beyond the entity indicator, determined at 1128, the network communications circuitry can communicate the entity search result to the client device without one or more additional results emphasized.

Referring back to the identification at 1126 of the entity indicator, where an entity cannot be identified, the operations 1100b can also include executing the search query on the non-entity search database at 1140, and communicating one or more non-entity search results to the client device over the network at 1142. The execution of the search query at 1140 can be performed by the search engine circuitry and the communication of the one or more non-entity search results at 1142 can be initiated by the network communications circuitry. Additional, in an example, whether or not the entity is identified, the execution of the search query at 1140 and the communication of the one or more non-entity search results at 1142 can occur.

Figure 12:
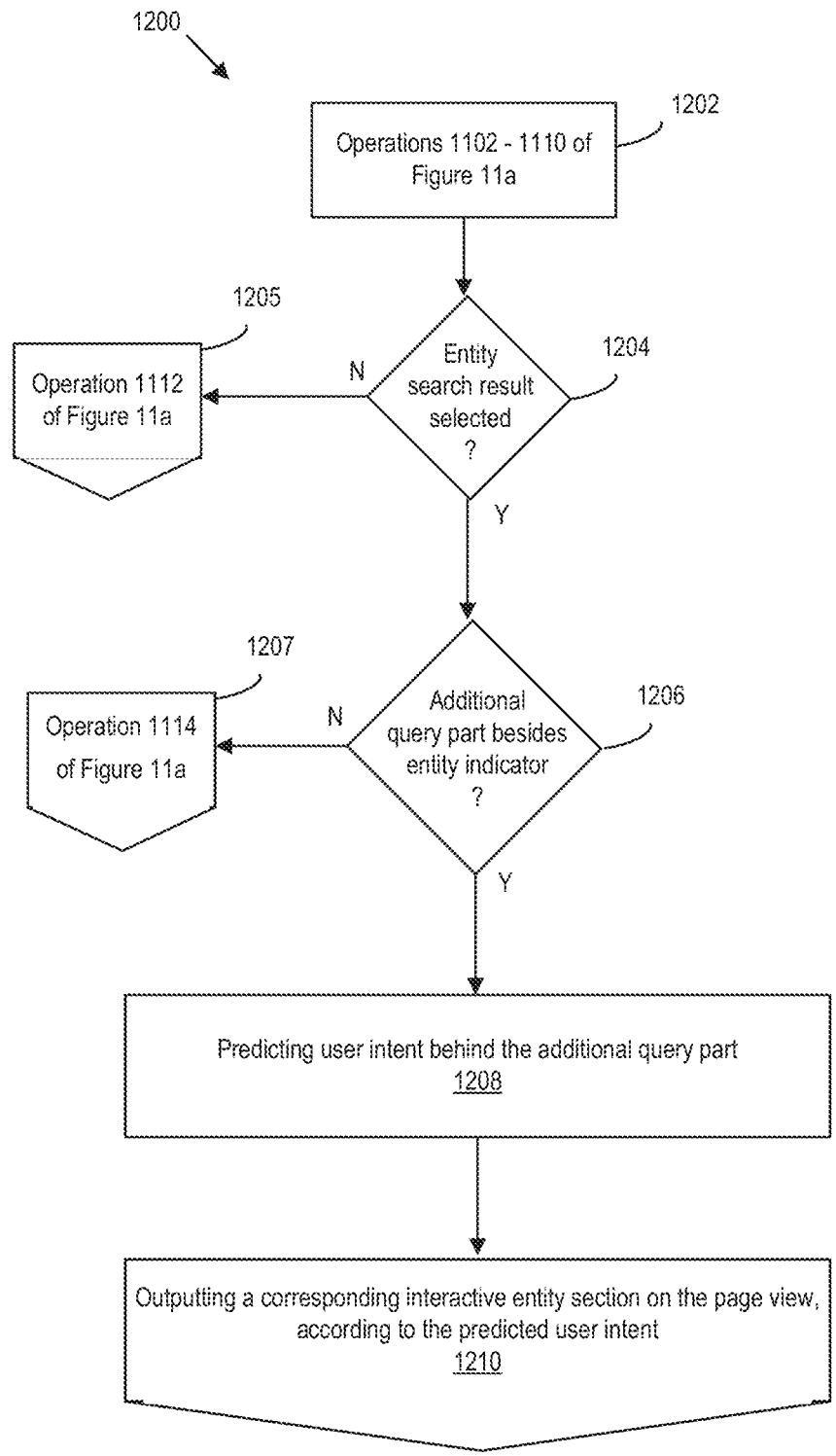
FIG. 12 illustrates example operations of example circuitry of an example system that can provide aspects of the module search object framework. In an example, the operations can be performed by circuitry of a client device such as any client device of the system illustrated in FIG. 1.

FIG. 12 illustrates example operations 1200 of example circuitry of an example system that can provide aspects of the module search object framework. In an example, the operations can be performed by circuitry of a client device such as any client device of the system illustrated in FIG. 1. The operations 1200 can include operations 1102-1110 of FIG. 11a, at 1202. The operations 1200 can also include identifying an entity indicator in the search query, such as according to the execution of the search query on the entity search database. This may be by an operation similar to the operation at 1126 of FIG. 11b, at 1204. Additionally or alternatively at least a part of this identification can occur at client-side circuitry of the client device. The operations 1200 can also include identifying an additional query part besides the entity indicator in the search query, such as by an operation similar to the operation at 1128 of FIG. 11b, at 1206. Also, at least a part of this identification can occur at the client-side circuitry of the client device.

Upon identifying the entity indicator at 1204, the operations 1200 can also include executing operations similar to operations 1130 of FIG. 11b, at 1208. Upon identifying the additional query part at 1206, the operations 1100b can also include executing operations similar to operations 1130 of FIG. 11b, at 1208. Also, at least a part of these operations can occur at the client-side circuitry of the client device. Alternatively, and as shown in FIG. 12, upon identifying an entity in the query at 1204 and an additional query part at 1206, circuitry of the client device and/or of the server can predict user intent behind the query with the additional query part at 1208. At operation 1210, the client-side circuitry can continue with outputting the corresponding interactive entity section on the page view, according to the predicted intent of the user with respect to the user's search. Where an entity cannot be identified, the operations 1200 can continue with operation 1112 of FIG. 11a, at 1205; and where an entity is identified, but an additional query part is not, the operations 1200 can continue with operation 1114, at 1207.

Figure 14:
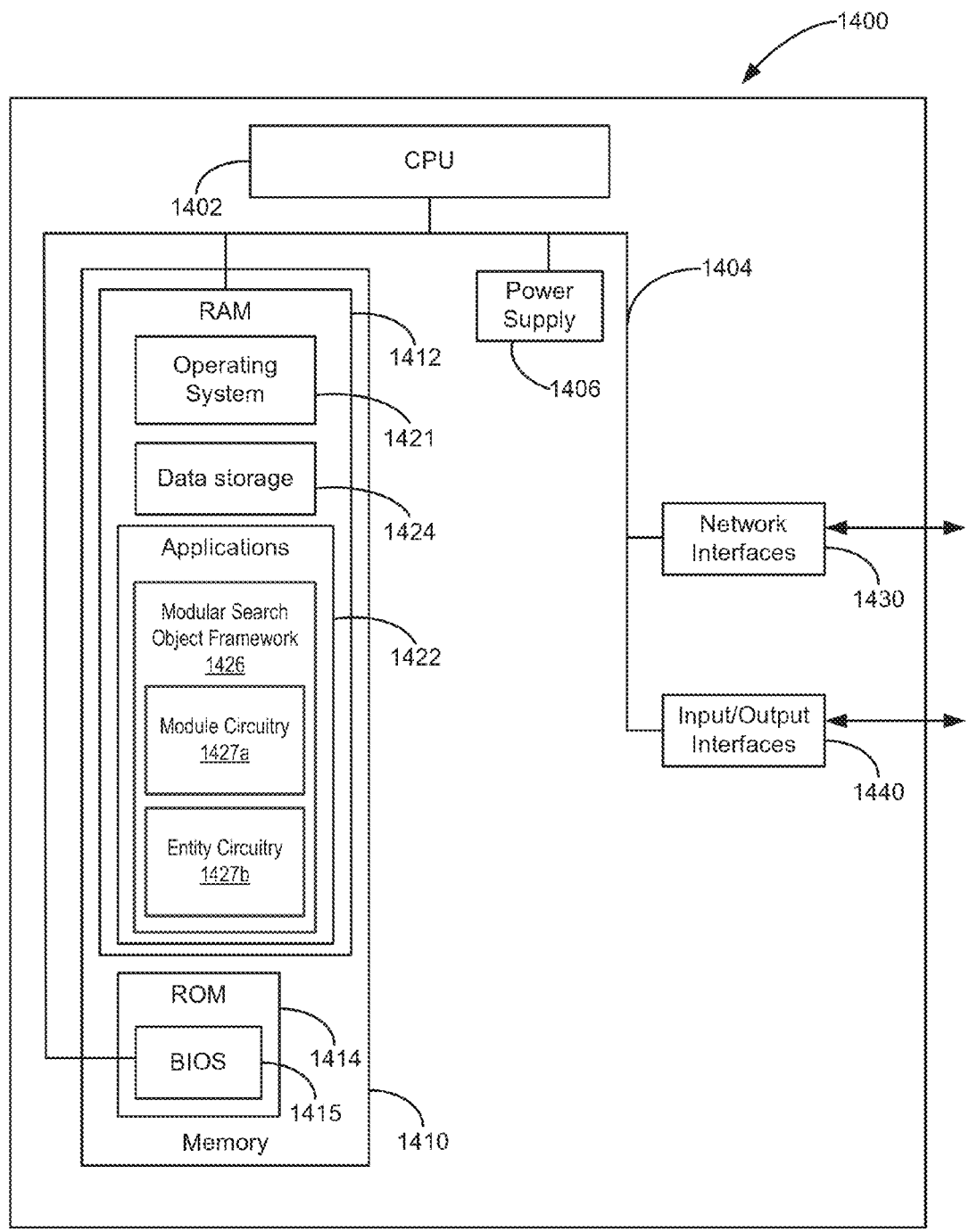

FIGS. 13 and 14 are block diagrams of example electronic devices that can implement aspects of and are related to the example system that can provide a modular search object framework. For example, FIG. 13 illustrates an example of the audience client device 124 in FIG. 1; and FIG. 14 illustrates an example of the search engine server 106 in FIG. 1, the modular search framework server 116, or an example server combining features of both servers.

FIG. 13 is a block diagram of an example electronic device 1300 that can implement client-side aspects of and related to aspects of the framework. For example, the electronic device 1300 can be any of the client devices described with respect to FIGS. 1 and 10, such as the audience client device 124. The electronic device 1300 can include a central processing unit (CPU) 1302, memory 1310, a power supply 1306, and input/output components, such as network interfaces 1330 and input/output interfaces 1340, and a communication bus 1304 that connects the aforementioned elements of the electronic device. The network interfaces 1330 can include a receiver and a transmitter (or a transceiver), and an antenna for wireless communications. The CPU 1302 can be any type of data processing device, such as a central processing unit (CPU). Also, for example, the CPU 1302 can be central processing logic; central processing logic may include hardware (such as circuits and/or microprocessors), firmware, software and/or combinations of each to perform functions or actions, and/or to cause a function or action from another component. Also, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software.

The memory 1310, which can include random access memory (RAM) 1312 or read-only memory (ROM) 1314, can be enabled by memory devices, such as a primary (directly accessible by the CPU) and/or a secondary (indirectly accessible by the CPU) storage device (such as flash memory, magnetic disk, optical disk).

The RAM 1312 can store data and instructions defining an operating system 1321, data storage 1324, and applications 1322, including the client-side application 1326 and the scripts and/or applets 1328 (such as scripts and/or applets adapted for framework client-side functions). The applications 1322 may include hardware (such as circuits and/or microprocessors), firmware, software, or any combination thereof. Example content provided by an application, such as the client-side application 1326, may include text, images, audio, video, or the like, which may be processed in the form of physical signals, such as electrical signals, for example, or may be stored in memory, as physical states, for example.

The ROM 1314 can include basic input/output system (BIOS) 1315 of the electronic device 1300. The power supply 1306 contains power components, and facilitates supply and management of power to the electronic device 1300. The input/output components can include various types of interfaces for facilitating communication between components of the electronic device 1300, components of external devices (such as components of other devices of the information system 100), and end users. For example, such components can include a network card that is an integration of a receiver, a transmitter, and I/O interfaces, such as input/output interfaces 1340. A network card, for example, can facilitate wired or wireless communication with other devices of a network. In cases of wireless communication, an antenna can facilitate such communication. The I/O components, such as I/O interfaces 1340, can include user interfaces such as monitors, keyboards, touchscreens, microphones, and speakers. Further, some of the I/O components, such as I/O interfaces 1340, and the bus 1304 can facilitate communication between components of the electronic device 1300, and can ease processing performed by the CPU 1302.

FIG. 14 is a block diagram of an example electronic device 1400 that can implement server-side aspects of and related to example aspects of the framework. For example, the electronic device 1400 can be a device that can implement the modular search framework server 116 of FIG. 1. The electronic device 1400 can include a CPU 1402, memory 1410, a power supply 1406, and input/output components, such as network interfaces 1430 and input/output interfaces 1440, and a communication bus 1404 that connects the aforementioned elements of the electronic device. The network interfaces 1430 can include a receiver and a transmitter (or a transceiver), and an antenna for wireless communications. The CPU 1402 can be any type of data processing device, such as a central processing unit (CPU). Also, for example, the CPU 1402 can be central processing logic.

The memory 1410, which can include random access memory (RAM) 1412 or read-only memory (ROM) 1414, can be enabled by memory devices. The RAM 1412 can store data and instructions defining an operating system 1421, data storage 1424, and applications 1422. The applications 1422 can include a modular search object framework 1426 (such as framework circuitry 908 illustrated in FIG. 9), which can include module circuitry 1427a (such as module circuitry 910) and entity circuitry 1427b (such as entity circuitry 912). The applications 1422 may include hardware (such as circuits and/or microprocessors), firmware, software, or any combination thereof. The ROM 1414 can include basic input/output system (BIOS) 1415 of the electronic device 1400.

The power supply 1406 contains power components, and facilitates supply and management of power to the electronic device 1400. The input/output components can include the interfaces for facilitating communication between any components of the electronic device 1400, components of external devices (such as components of other devices of the information system 100), and end users. For example, such components can include a network card that is an integration of a receiver, a transmitter, and I/O interfaces, such as input/output interfaces 1440. The I/O components, such as I/O interfaces 1440, can include user interfaces such as monitors, keyboards, touchscreens, microphones, and speakers. Further, some of the I/O components, such as I/O interfaces 1440, and the bus 1404 can facilitate communication between components of the electronic device 1400, and can ease processing performed by the CPU 1402.

The invention claimed is:

1. A system comprising:
network communications circuitry, configured to:
receive a search query from a client device, over a network;
communicate an entity search result to the client device over the network;
search engine circuitry communicatively coupled to the network communications circuitry, the search engine circuitry comprising a processor, the processor configured to:
execute the search query on an entity search database, wherein the entity search database comprises a plurality of entity circuitries, wherein individual ones of the entity circuitries comprises a single root object for a single person entity, a single place entity, or a single thing entity that is different from other individual ones of the entity circuitries;
identify an entity indicator in the search query, according to the execution of the search query on the entity search database;
identify the entity search result, according to the entity indicator;
identify an additional query part besides the entity indicator in the search query, according to the execution of the search query on the entity search database;
execute a non-entity query using the additional query part on a non-entity search database with respect to the entity search result, wherein the non-entity search database comprises multiple root objects for a single person entity, a single place entity, or a single thing entity;
identify one or more non-entity search results, according to the execution of the non-entity query;
alter a display of the entity search result to include the one or more non-entity search results; and
emphasize the one or more non-entity search results in the entity search result.

2. The system of claim 1, wherein the processor is further configured to predict one or more search results a user likely intended to receive.

3. The system of claim 1, wherein the processor is further configured to interpret the search query as a question, and wherein the one or more non-entity search results are one or more answers to the question.

4. The system of claim 1, wherein the processor is further configured to determine whether the one or more non-entity search results exist in the entity search result.

5. The system of claim 1, wherein the network communications circuitry is further configured to communicate the one or more non-entity search results to the client device over the network.

6. The system of claim 1, wherein the processor is further configured to add a visual representation of the one or more non-entity search results in a predetermined position in a first graphical user interface (GUI) to appear after a user selects the entity search result on the client device.

7. The system of claim 6, wherein the predetermined position is a variable position relative to other viewable information in the first GUI.

8. The system of claim 6, wherein the predetermined position is fixed.

9. The system of claim 6, wherein the predetermined position is above all text of the first GUI besides a displayed title of the first GUI.

10. The system of claim 1, wherein the processor is further configured to include a visual representation of the one or more non-entity search results in a most forefront part of a first GUI to appear after a user selects the entity search result on the client device.

11. The system of claim 10, wherein the processor is further configured to make the most forefront part appear closer to the user viewing the first GUI than other parts.

12. The system of claim 10, wherein the processor is further configured to make the most forefront part overlap at least one other part of the first GUI and overlap a background part and not overlapped by any part of the first GUI.

13. The system of claim 10, wherein the processor is further configured to make the most forefront part sharper than at least a majority of other parts of the first GUI.

14. The system of claim 1, wherein the processor is configured to:
make a visual representation of the one or more additional search results contrasting with background elements of a first GUI greater than contrasting of at least a majority of other visual objects of the first GUI with the background elements; and
make the first GUI appear after a user selects the entity search result on the client device.

15. The system of claim 1, wherein the processor is configured to enlarge a visual representation of the one or more additional search results relative to all other visual objects of a first GUI to appear after a user selects the entity search result on the client device.

16. The system of claim 1, wherein the processor is configured to reduce sizes of at least a majority of visual objects in a first GUI to appear after a user selects the entity search result on the client device, the at least a majority of visual objects excluding a visual representation of the one or more additional search results and a background object of the first GUI.

17. The system of claim 1, wherein the processor is configured to output audio of the one or more additional search results after a user selects the entity search result on the client device while a first GUI to appear after the user selects the entity search result on the client device is outputted.

18. A method, comprising:
receiving, by network communications circuitry over a network, a search query from a client device, over a network;
executing, by search engine circuitry comprising a processor, the search engine circuitry coupled to the network communications circuitry, the search query on an entity search database, wherein the entity search database comprises a plurality of entity circuitries, wherein individual ones of the entity circuitries comprises a single root object for a single person entity, a single place entity, or a single thing entity that is different from the other individual ones of the entity circuitries;
identifying, by the circuitry, an entity indicator in the search query, according to the execution of the search query on the entity search database;
identifying, by the circuitry, an entity search result, according to the entity indicator;
communicating, by network communications circuitry coupled to the search engine circuitry, the entity search result to the client device over the network;
identifying, by the circuitry, an additional query part besides the entity indicator in the search query, according to the execution of the search query on the entity search database;
executing, by the circuitry, a non-entity query using the additional query part on a non-entity search database, wherein the non-entity search database comprises of multiple root objects for a single person entity, a single place entity, or a single thing entity;
identifying, by the circuitry, one or more non-entity search results, according to the execution of the non-entity query;
altering, by the circuitry, a display of the entity search result to include the one or more non-entity search results; and
emphasizing, by the circuitry, the one or more non-entity search results.

* * * * *